(12) United States Patent
Matsuyama

(10) Patent No.: US 8,317,401 B2
(45) Date of Patent: Nov. 27, 2012

(54) SLIDE BEARING

(75) Inventor: Yutaka Matsuyama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 659 days.

(21) Appl. No.: 12/444,611

(22) PCT Filed: Oct. 12, 2007

(86) PCT No.: PCT/JP2007/069928
§ 371 (c)(1),
(2), (4) Date: Apr. 7, 2009

(87) PCT Pub. No.: WO2008/047701
PCT Pub. Date: Apr. 24, 2008

(65) Prior Publication Data
US 2010/0046869 A1    Feb. 25, 2010

(30) Foreign Application Priority Data
Oct. 12, 2006    (JP) ................... 2006-279192

(51) Int. Cl.
*F16C 33/10* (2006.01)
(52) U.S. Cl. ........................ 384/288; 384/291
(58) Field of Classification Search ............... 384/288, 384/291, 294
See application file for complete search history.

(56) References Cited

U.S. PATENT DOCUMENTS

| | | | |
|---|---|---|---|
| 1,948,340 A * | 2/1934 | Dolza et al. | 184/6.5 |
| 5,009,522 A | 4/1991 | Hahn | |
| 6,176,621 B1 | 1/2001 | Naitoh et al. | |
| 2003/0179966 A1 | 9/2003 | Hojo et al. | |
| 2005/0047689 A1 | 3/2005 | Yamazaki et al. | |
| 2005/0196084 A1 | 9/2005 | Kitahara et al. | |

FOREIGN PATENT DOCUMENTS

| | | |
|---|---|---|
| EP | 1 510 709 A2 | 3/2005 |
| JP | 39-034683 | 11/1964 |
| JP | 61-000573 Y2 | 1/1986 |

(Continued)

OTHER PUBLICATIONS

Decision on Grant, corresponding to Russian Patent Application No. 2009117679/11(024258), dated Mar. 26, 2010.

(Continued)

*Primary Examiner* — William C Joyce
(74) *Attorney, Agent, or Firm* — Sughrue Mion, PLLC

(57) ABSTRACT

A crank bearing is disclosed that includes a semicircular upper bearing and a semicircular lower bearing, which can be split from each other. The upper bearing includes a first oil passage for introducing engine oil from the outside to a gap between the crank bearing and a crank journal, and a second oil passage for permitting the engine oil to flow in the circumferential direction of the crank bearing. The first oil passage includes an inner circumference opening, which is open to the inner circumference of the main bearing. The upper bearing includes a non-undercut portion in which no oil passage is formed on the trailing side of the inner circumference opening in the rotational direction of the crank journal. A chamfer oil passage for discharging the engine oil in the second oil passage to the outside from the axial direction of the crank bearing is provided in at least one of the lower bearing and a region on the proceeding side of the circumference opening in the rotational direction of the crank journal.

14 Claims, 27 Drawing Sheets

FOREIGN PATENT DOCUMENTS

| | | |
|---|---|---|
| JP | 4-32320 U | 3/1992 |
| JP | 04-219521 A | 8/1992 |
| JP | 07-208480 A | 8/1995 |
| JP | 10-030419 A | 2/1998 |
| JP | 2001-263015 A | 9/2001 |
| JP | 2004-340249 A | 12/2004 |
| JP | 2005-069283 A | 3/2005 |
| JP | 2005-069284 A | 3/2005 |
| JP | 2005-076755 A | 3/2005 |
| JP | 2005-249024 A | 9/2005 |
| SU | 92732 | 2/1950 |
| WO | 2004-038188 A1 | 5/2004 |

OTHER PUBLICATIONS

European Search Report issued Feb. 9, 2012 for corresponding European Application No. 07829664.7.

* cited by examiner

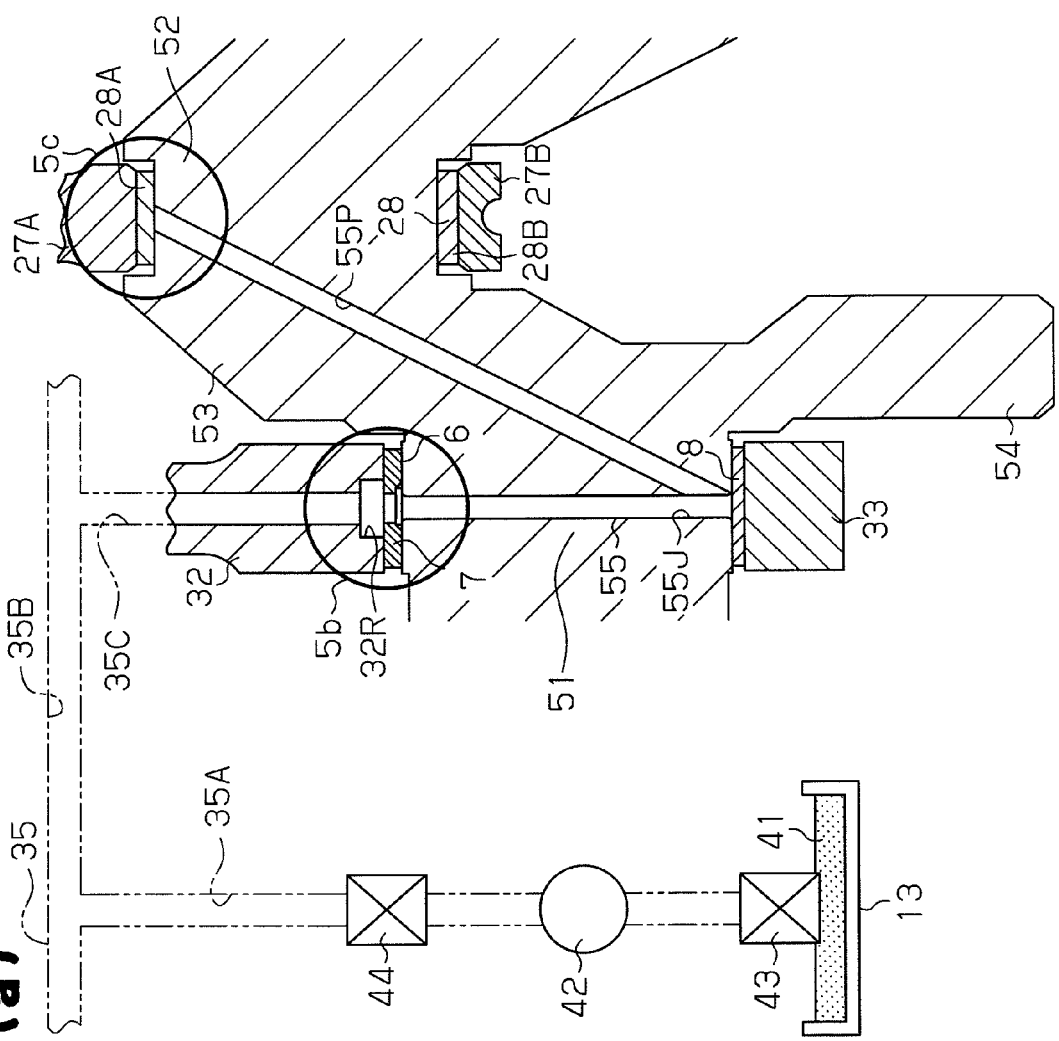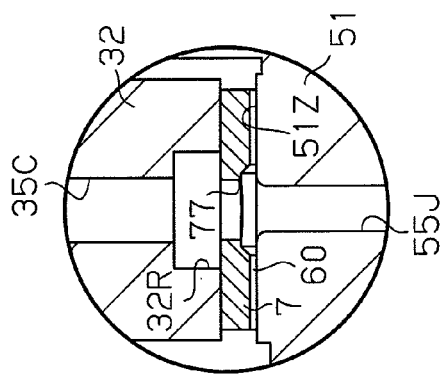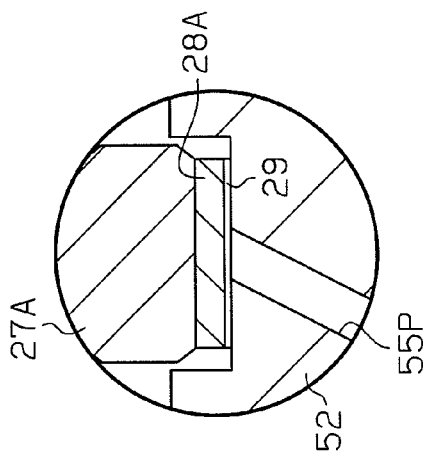

Fig.17
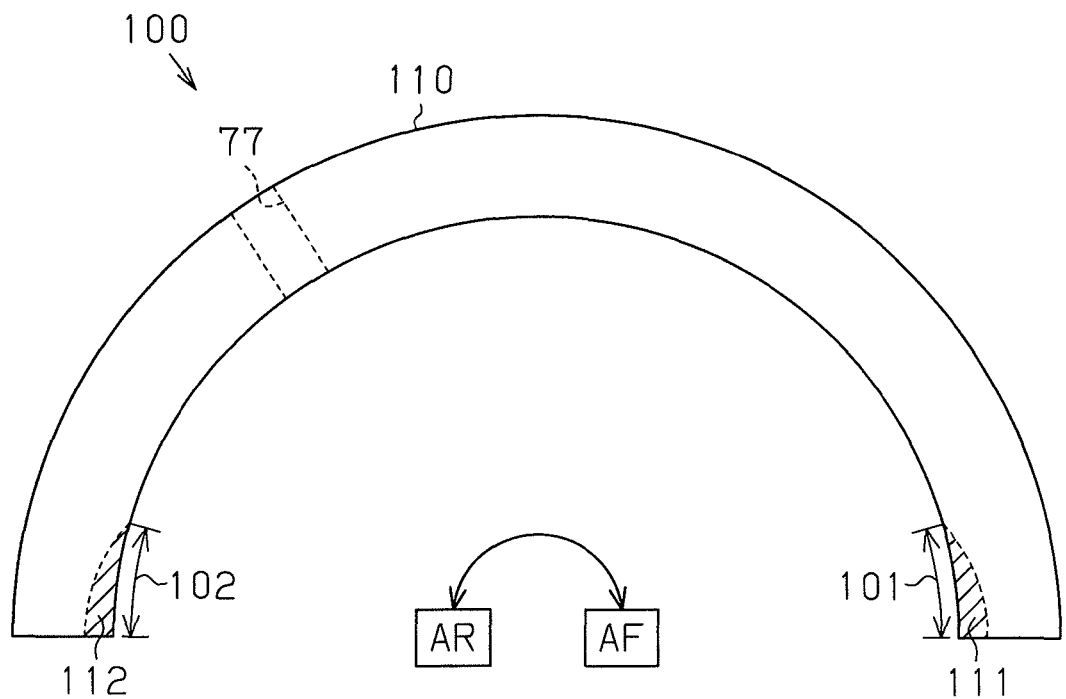
Fig.18
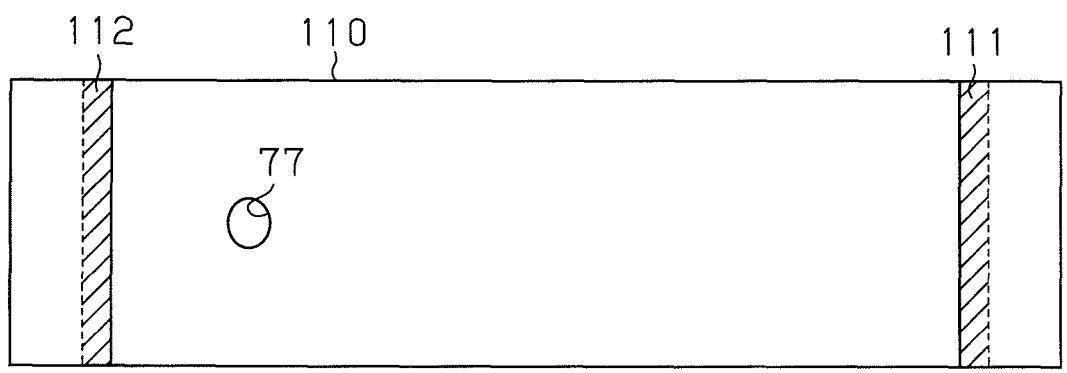
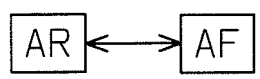

Fig.21
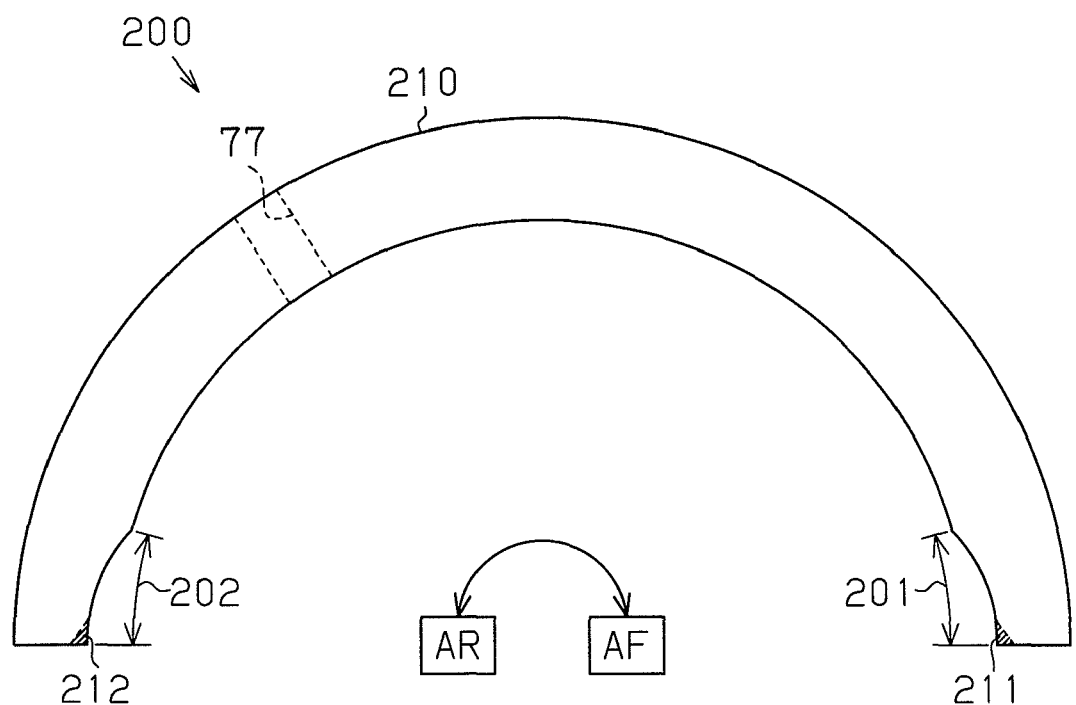
Fig.22
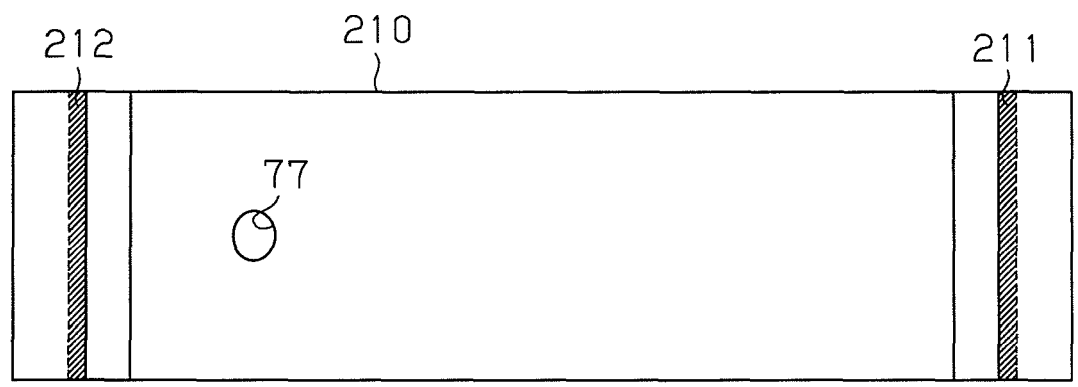
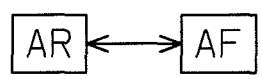

Fig.28
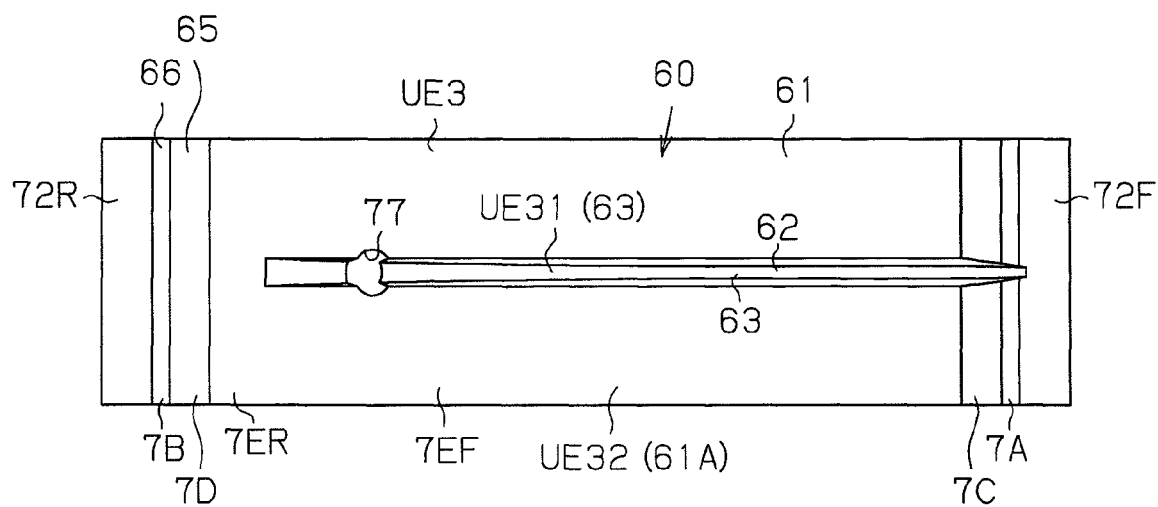
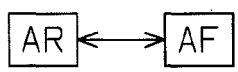

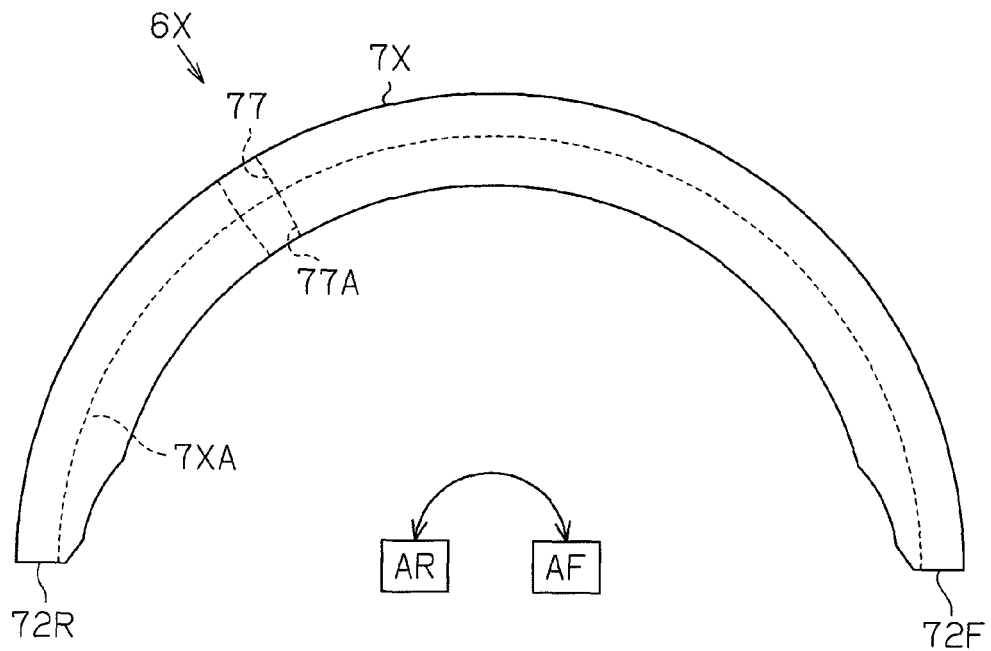
Fig.29
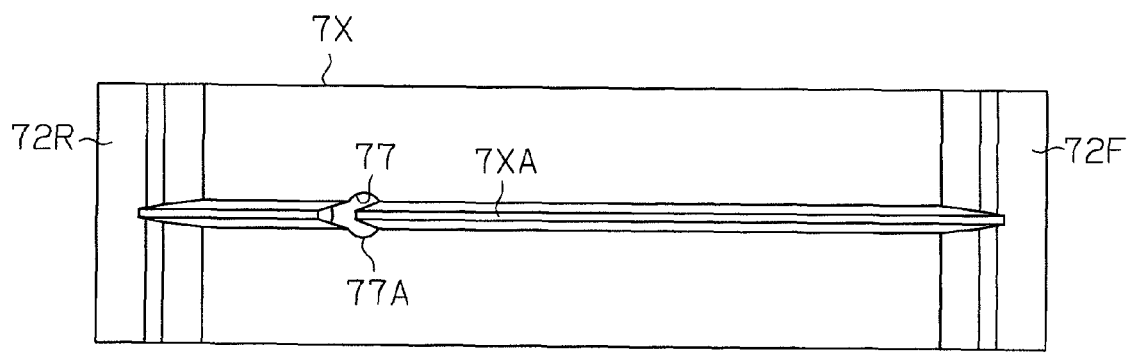
Fig.30
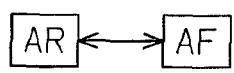

Fig.35
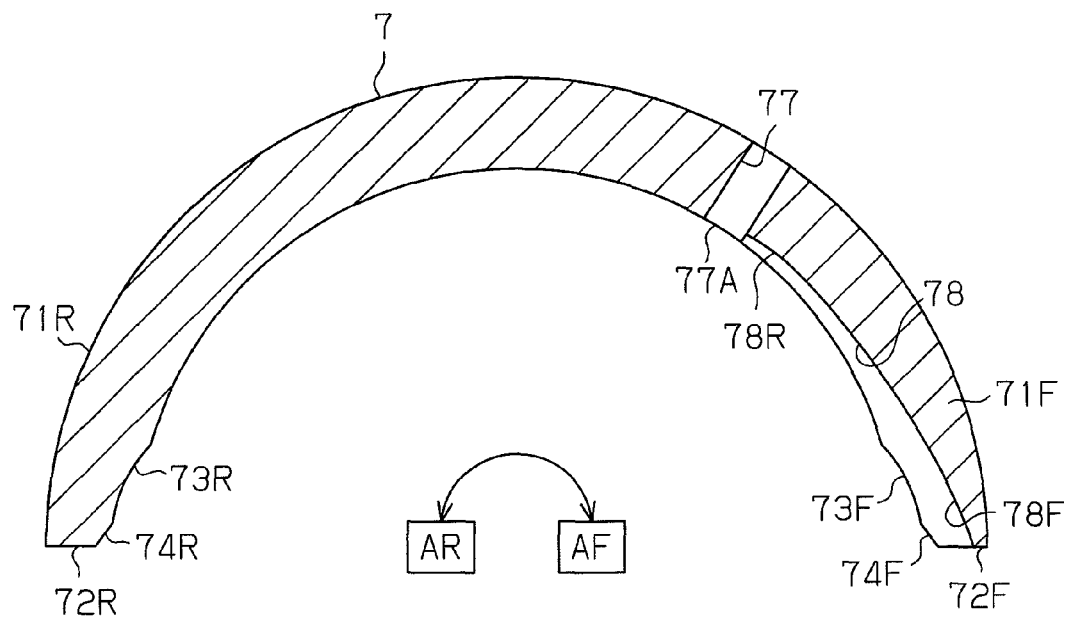
Fig.36
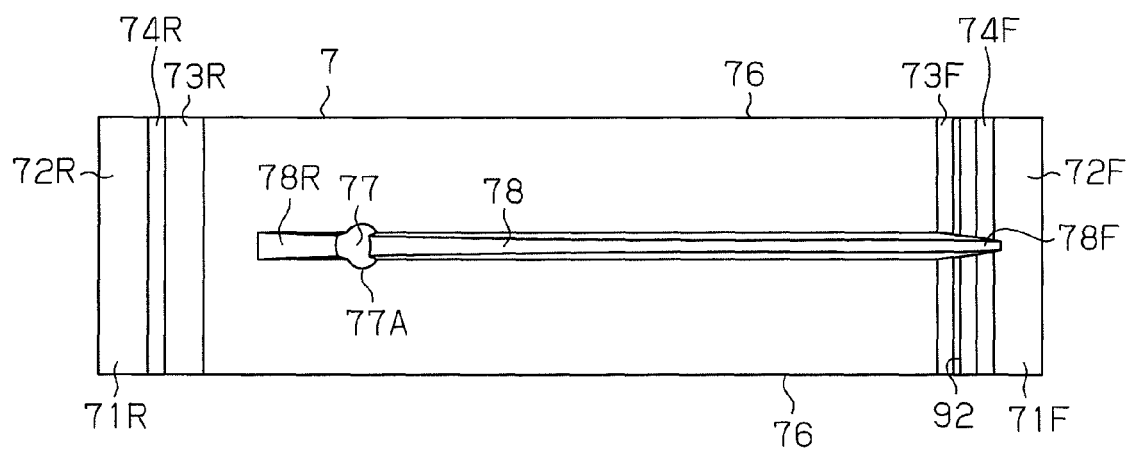
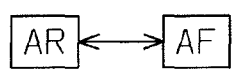

Fig.37(a)
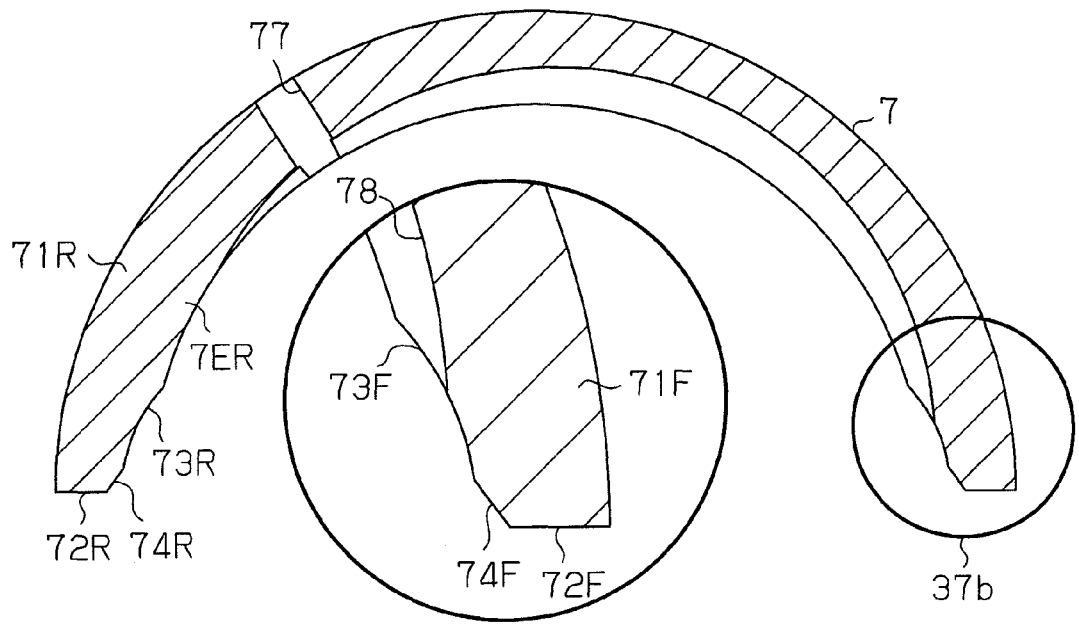
Fig.37(b)
Fig.38(a)
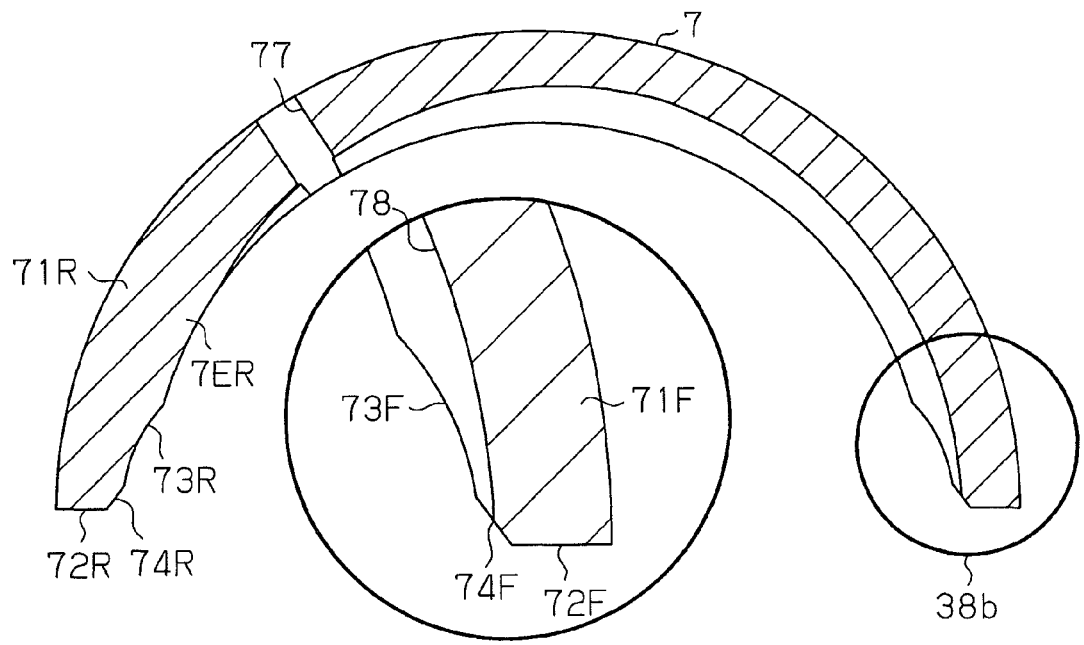
Fig.38(b)

SLIDE BEARING

FIELD OF THE INVENTION

The present invention relates to a slide bearing that is split into a pair of semicircular bearing bodies and supports a rotary shaft with lubricant.

BACKGROUND OF THE INVENTION

The slide bearing is utilized as, for example, a crank bearing for supporting a crankshaft of an engine. A typical crank bearing is configured by a combination of a semicircular upper bearing and a semicircular lower bearing. The upper bearing is provided with an oil hole for supplying engine oil in the engine main body to an oil clearance, which is a space between the crank bearing and a crank journal, and an oil groove for permitting the engine oil supplied to the oil clearance through the oil hole to flow in the circumferential direction of the crank bearing.

However, in the conventional crank bearing, since the oil groove is formed to connect one of matching surfaces of the upper bearing to the other matching surface, the lubricity of the crank bearing is reduced as the amount of the engine oil that flows out of the oil clearance is increased. Thus, Patent Document 1 proposes the following crank bearing. That is, in the upper bearing of the crank bearing disclosed in Patent Document 1, both ends of the oil groove are formed to become end at positions circumferentially inward from the matching surfaces.

However, in the engine provided with the crank bearing disclosed in Patent Document 1, since a large amount of foreign matter is retained in the oil groove, there is high possibility of damaging the crank bearing or damaging a bearing supporting the connecting rod. Thus, there is a need for a crank bearing that reduces the amount of the engine oil that flows out of the oil clearance while inhibiting damage caused by foreign matter. Such a problem is not limited to the crank bearing of the engine, but may arise in any slide bearing that is divided into a pair of semicircular bearing bodies and supports a rotary shaft with lubricant.

Patent Document 1: Japanese Laid-Open Patent Publication No. 2005-249024

SUMMARY OF THE INVENTION

Accordingly, it is an objective of the present invention to provide a slide bearing that reduces the amount of lubricant that flows out of an oil clearance while inhibiting damage caused by foreign matter, and a torque transmitting apparatus and an engine provided with the slide bearing.

To achieve the above objective and in accordance with a first aspect of the present invention, a slide bearing for supporting a rotary shaft is provided. The slide bearing includes a semicircular main bearing body and a semicircular sub-bearing body, which can be split from each other. The main bearing body includes a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing. The first oil passage includes an inner opening, which is open to the inner circumference of the main bearing body. The main bearing body includes a non-undercut portion in which no oil passage is formed on the trailing side of the inner circumference opening in the rotational direction of the rotary shaft. An auxiliary oil passage for discharging the lubricant in the second oil passage to the outside from the axial direction of the slide bearing is provided in at least one the sub-bearing body and a region on the leading side of the inner circumference opening of the main bearing body in the rotational direction of the rotary shaft.

In accordance with a second aspect of the present invention, a slide bearing for supporting a rotary shaft is provided. The slide bearing includes a semicircular main bearing body and a semicircular sub-bearing body, which can be split from each other. The main bearing body includes a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing. The first oil passage includes an inner circumference opening, which is open to the inner circumference of the main bearing body. The main bearing body includes a non-undercut portion in which no oil passage is formed on the trailing side of the inner circumference opening in the rotational direction of the rotary shaft. The main bearing body includes a leading end portion located on the leading side of the inner circumference opening in the rotational direction of the rotary shaft, and the sub-bearing portion includes a trailing end portion corresponding to the leading end portion. An auxiliary oil passage, which connects the second oil passage to a side surface of the slide bearing, is provided at the matching portion between the leading end portion of the main bearing body and the trailing end portion of the sub-bearing body. A crush relief, which forms a relief oil passage, and a chamfer, which forms a chamfer oil passage, are provided on the inner circumference of at least one of the leading end portion of the main bearing body and the trailing end portion of the sub-bearing body. The auxiliary oil passage is formed by the relief oil passage and the chamfer oil passage. The relationship between the passage area of the chamfer oil passage and the passage area of the relief oil passage is set such that the flow rate of the lubricant in the chamfer oil passage is greater than the flow rate of the lubricant in the relief oil passage.

In accordance with a third aspect of the present invention, a torque transmitting apparatus including the slide bearing, which supports a rotary shaft, and a main shaft, which rotates in one direction serving as the rotary shaft, is provided.

In accordance with a fourth aspect of the present invention, an engine including the slide bearing, which supports a rotary shaft, and a crank shaft, which serves as the rotary shaft supported by the slide bearing, is provided.

BRIEF DESCRIPTION OF THE DRAWINGS

FIG. 5(*a*) is a schematic view illustrating the engine oil passage of the engine of FIG. 1;

FIG. 5(*b*) is an enlarged view of the part surrounded by circle 5*b* in FIG. 5(*a*);

FIG. 5(*c*) is an enlarged view of the part surrounded by circle 5*c* in FIG. 5(*a*);

FIG. 17 is a front view illustrating an upper bearing of a first imaginary bearing;

FIG. 18 is a bottom view illustrating the inner circumferential surface of the upper bearing of FIG. 17;

FIG. 21 is a front view illustrating an upper bearing of a second imaginary bearing;

FIG. 22 is a bottom view illustrating the inner circumferential surface of the upper bearing of FIG. 21;

FIG. 28 is a bottom view illustrating the inner circumferential surface of the upper bearing of FIG. 26;

FIG. 29 is a front view illustrating an upper bearing according to a comparative example in which part of the upper bearing of the first embodiment is modified;

FIG. 30 is a bottom view illustrating the inner circumferential surface of the upper bearing of FIG. 29;

FIG. 35 is a cross-sectional view illustrating an upper bearing according to a sixth embodiment of the present invention;

FIG. 36 is a bottom view illustrating the inner circumferential surface of an upper bearing according to a seventh embodiment of the present invention;

FIG. 37(a) is a cross-sectional view illustrating an upper bearing according to an eighth embodiment of the present invention;

FIG. 37(b) is an enlarged view illustrating the part surrounded by circle 37b in FIG. 37(a);

FIG. 38(a) is a cross-sectional view illustrating an upper bearing according to a ninth embodiment of the present invention;

FIG. 38(b) is an enlarged view illustrating the part surrounded by circle 38b in FIG. 38(a);

DETAILED DESCRIPTION OF THE PREFERRED EMBODIMENTS

A first embodiment of the present invention will now be described with reference to FIGS. 1 to 30. In the first embodiment, a slide bearing of the present invention is applied to a crank bearing 6, which supports a crankshaft 5 of an inline four-cylinder engine 1.

[1] Structure of Engine 1

Figure 1:
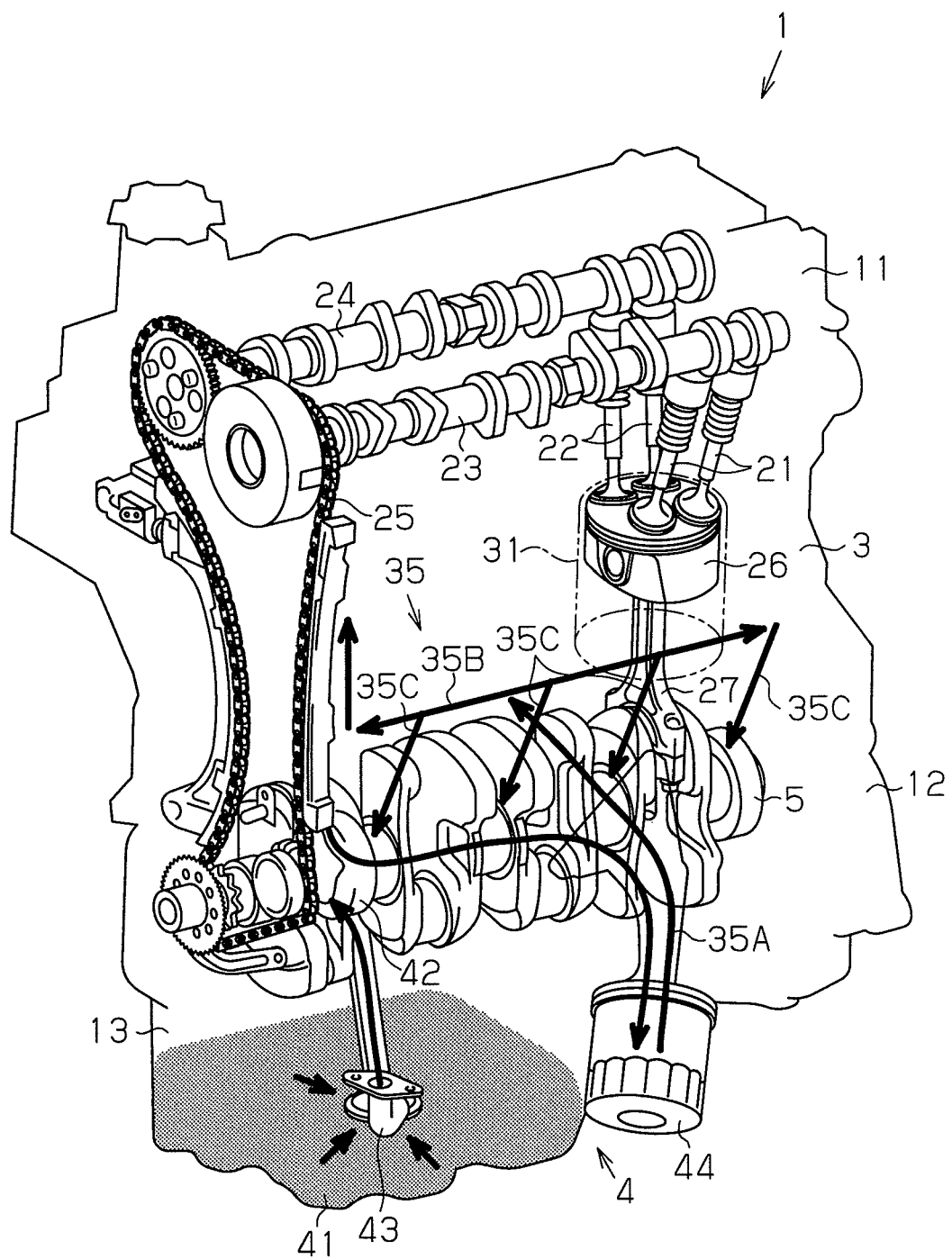
FIG. 1 is a perspective view illustrating an engine including a crank bearing according to a first embodiment of the present invention.

FIG. 1 is a diagram illustrating the entire structure of the engine 1. The engine 1 includes a cylinder block 3 for burning a mixture of air and fuel, a cylinder head 11 for arranging components of a valve train, a crank case 12 for arranging a crankshaft 5, and an oil pan 13 for storing lubricant, which is engine oil 41 in the first embodiment. The engine 1 also includes a lubricating device 4 for supplying the engine oil 41 to each part of the engine 1.

The cylinder block 3 is provided with cylinders 31, which form combustion chambers in which the air-fuel mixture is burned. Each cylinder 31 accommodates a piston 26, which reciprocates in accordance with combustion of the air-fuel mixture. A timing chain 25 for transmitting torque of the engine 1 to each device is wound around the crankshaft 5. A connecting rod 27, which converts reciprocation of the pistons 26 to rotation of the crankshaft 5, is attached to each cylinder 31. The cylinder head 11 is provided with intake valves 21, which selectively open and close intake ports of the cylinders 31 with respect to the combustion chambers, and an intake camshaft 23, which drives the intake valves 21. The cylinder head 11 is provided with exhaust valves 22, which selectively open and close exhaust ports of the cylinders 31 with respect to the combustion chambers, and an exhaust camshaft 24, which drives the exhaust valves 22.

The lubricating device 4 includes an oil pump 42, which supplies the engine oil 41 stored in the bottom portion of the oil pan 13 to each part of the engine 1. Also, the lubricating device 4 includes an oil strainer 43, which filters the engine oil 41 upstream of an inlet of the oil pump 42, and an oil filter 44, which filters the engine oil 41 downstream of an outlet of the oil pump 42. The oil pump 42 is driven by torque of the crankshaft 5 transmitted via the timing chain 25.

Figure 2:
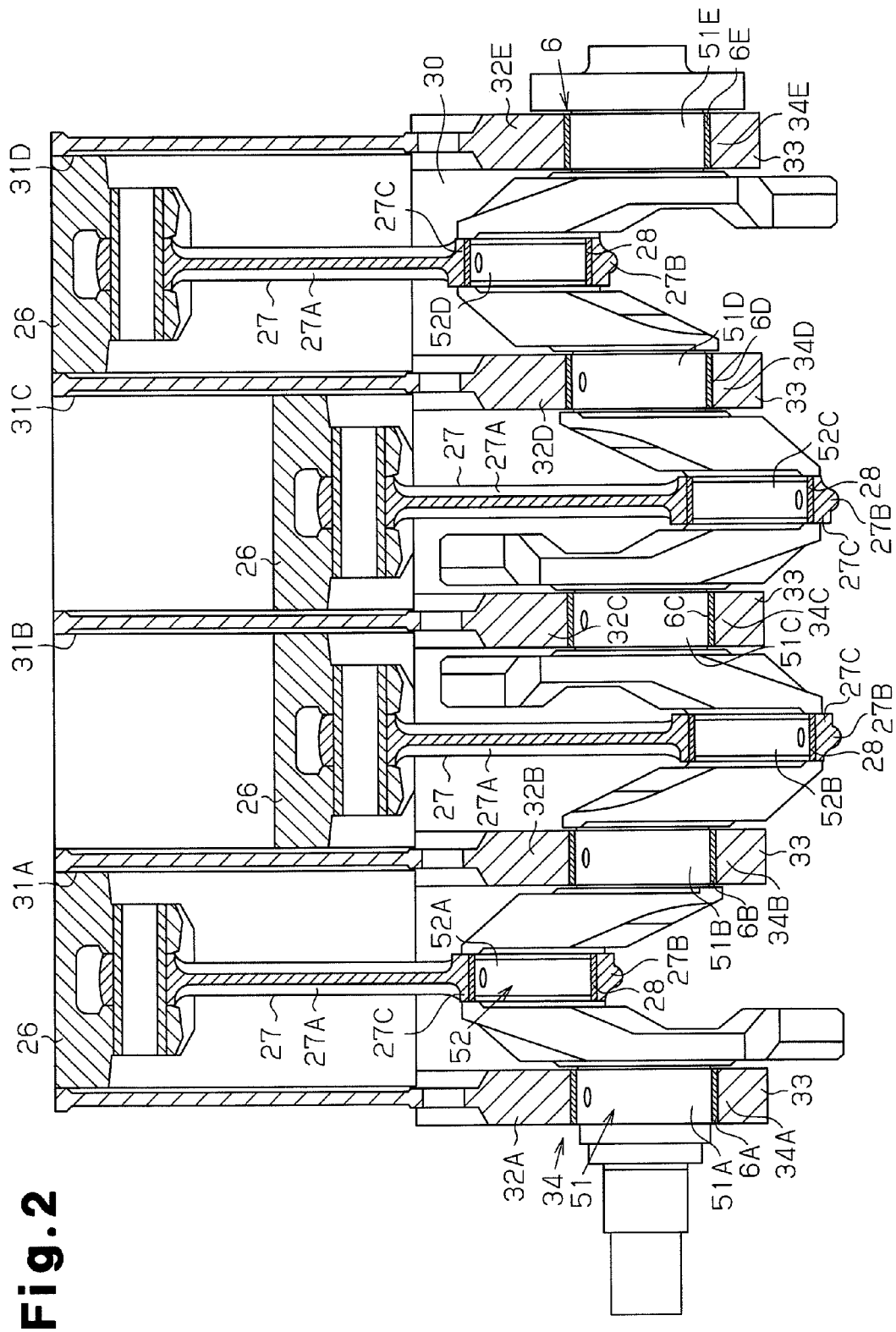
FIG. 2 is a cross-sectional view illustrating the cylinders and the surrounding structure of the engine of FIG. 1.
Figure 3:
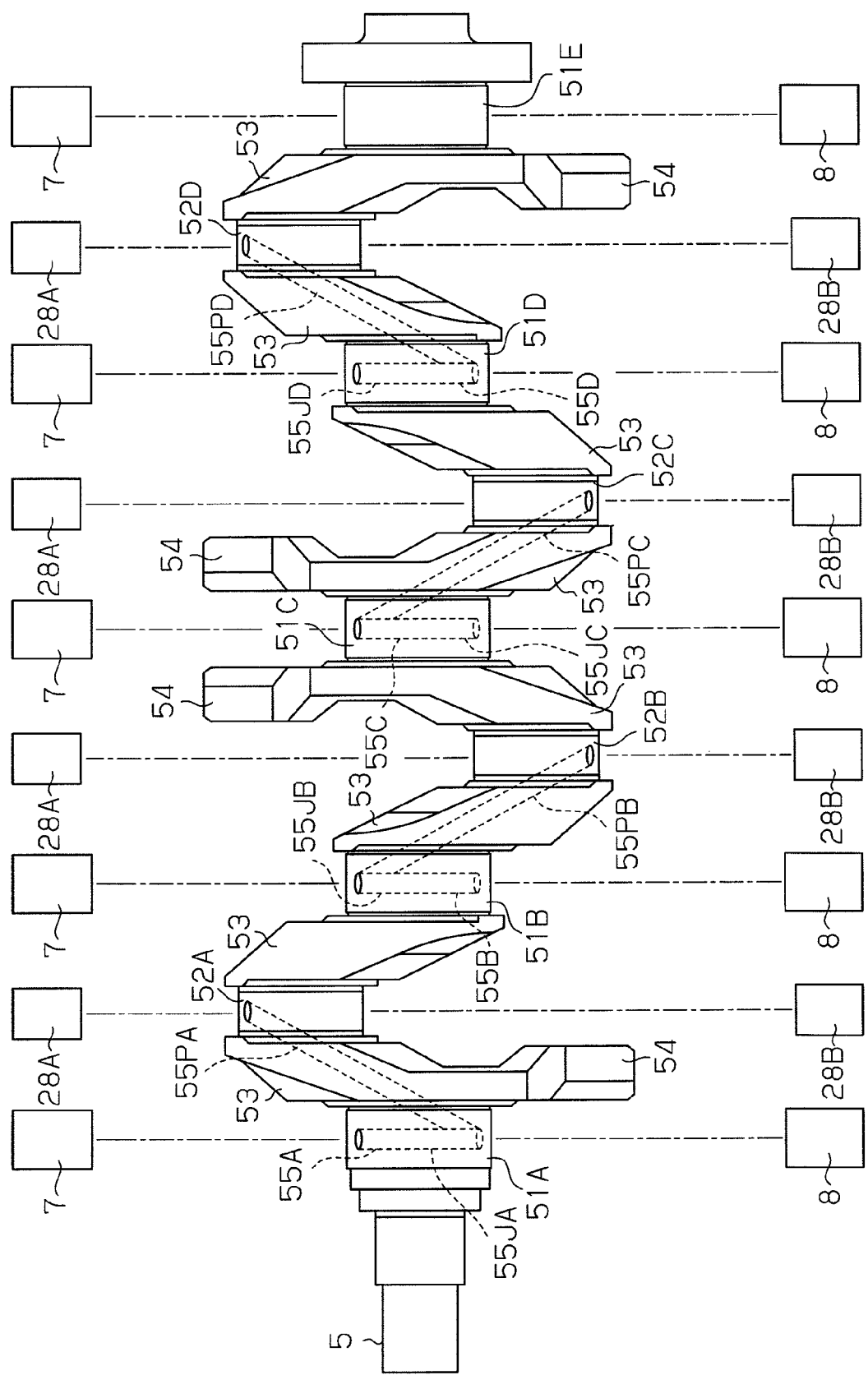
FIG. 3 is a front view illustrating the crankshaft of the engine of FIG. 1.
Figure 4:
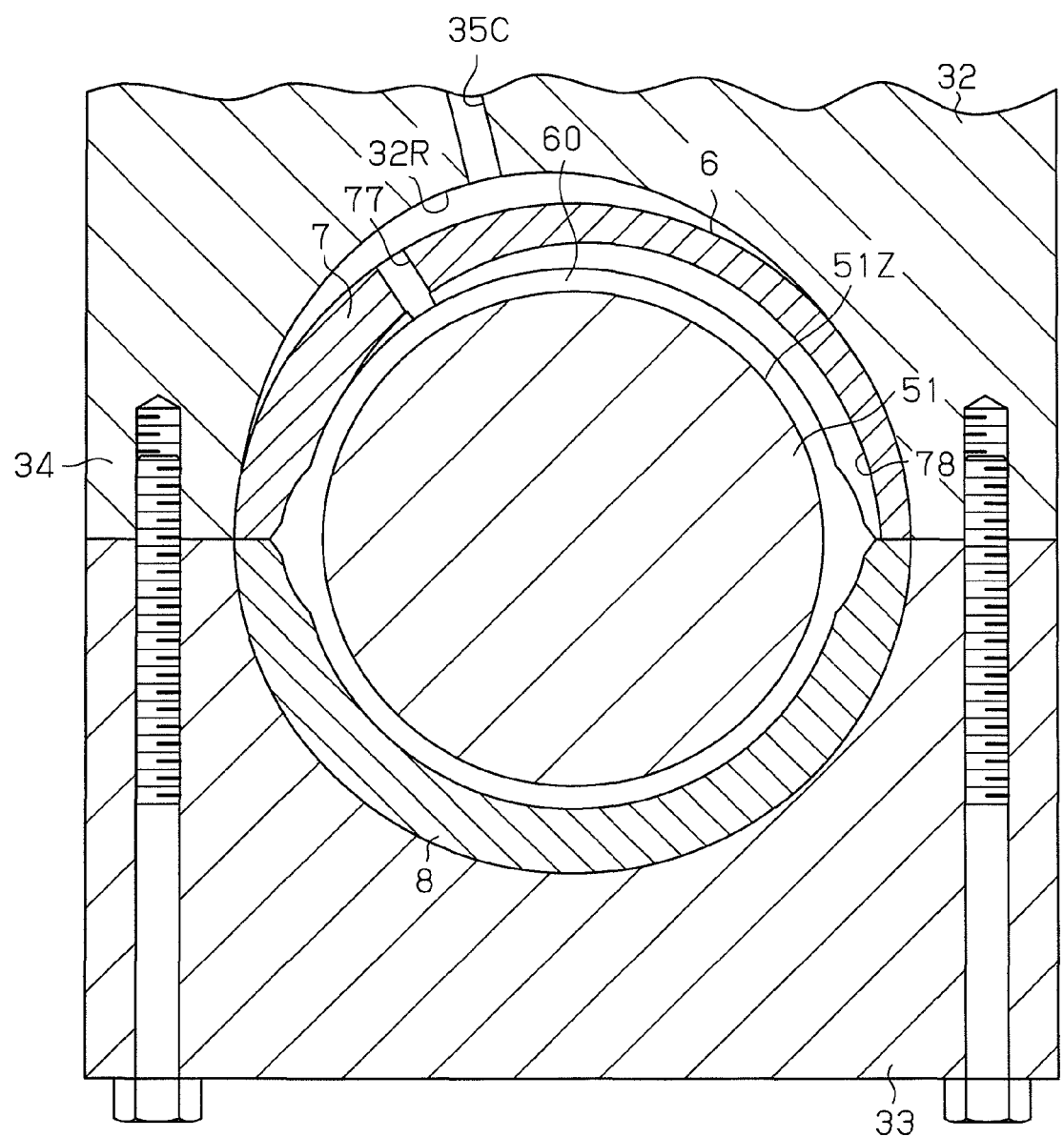
FIG. 4 is a cross-sectional view illustrating the crank journal and the surrounding structure of the engine of FIG. 1.

Specific structure of the cylinder block 3 and the crankshaft 5 will now be described with reference to FIGS. 2 to 4. FIG. 2 shows the cross-sectional structure of the cylinders 31 and the surrounding structure of the engine 1 and the crankshaft 5. FIG. 3 shows the structure of the crankshaft 5 as viewed from the front. FIG. 4 shows the cross-sectional structure of the crank journal 51 of the crankshaft 5 and the surrounding structure in the engine 1.

The cylinder block 3 is provided with a first cylinder 31A, a second cylinder 31B, a third cylinder 31C, and a fourth cylinder 31D as the cylinders 31. The cylinder block 3 is provided with a first partition wall 32A, a second partition wall 32B, a third partition wall 32C, a fourth partition wall 32D, and a fifth partition wall 32E as partition walls 32 for dividing the crank chamber 30 into several chambers.

A crank cap 33 is attached to each partition wall 32. Each crank cap 33 supports the crankshaft 5 together with the corresponding partition wall 32. The first partition wall 32A is located at the position closest to the timing chain 25 among the partition walls 32. The second partition wall 32B is located at the position corresponding to the position between the first cylinder 31A and the second cylinder 31B. The third partition wall 32C is located at the position corresponding to the position between the second cylinder 31B and the third cylinder 31C. The fourth partition wall 32D is located at the position corresponding to the position between the third cylinder 31C and the fourth cylinder 31D. The fifth partition wall 32E is located at the position farthest from the timing chain 25 among the partition walls 32.

The crankshaft 5 is includes, as the crank journal 51 (rotary shaft), which is a main shaft, a first crank journal 51A, a second crank journal 51B, a third crank journal 51C, a fourth crank journal 51D, and a fifth crank journal 51E. The crankshaft 5 also includes, as crank pins 52 for mounting the connecting rods 27, a first crank pin 52A, a second crank pin 52B, a third crank pin 52C, and a fourth crank pin 52D. The crankshaft 5 further includes crank arms 53 for connecting the crank journals 51 and the crank pins 52 that are adjacent to each other. Also, the crank arms 53 are provided with counterweights 54.

The first crank journal 51A is located at the position closest to the timing chain 25 among the crank journals 51. The second crank journal 51B is located at the position corresponding to the position between the first cylinder 31A and the second cylinder 31B. The third crank journal 51C is located at the position corresponding to the position between the second cylinder 31B and the third cylinder 31C. The fourth crank journal 51D is located at the position corresponding to the position between the third cylinder 31C and the fourth cylinder 31D. The fifth crank journal 51E is located at the position farthest from the timing chain 25 among the crank journals 51. The first crank pin 52A is located at the position corresponding to the first cylinder 31A. The second crank pin 52B is located at the position corresponding to the second cylinder 31B. The third crank pin 52C is located at the position corresponding to the third cylinder 31C. The fourth crank pin 52D is located at the position corresponding to the fourth cylinder 31D.

The cylinder block 3 includes, as crankshaft receiving portions 34 for supporting the crankshaft 5 to be rotatable with respect to the cylinder block 3, a first crankshaft receiving portion 34A, a second crankshaft receiving portion 34B, a third crankshaft receiving portion 34C, a fourth crankshaft receiving portion 34D, and a fifth crankshaft receiving portion 34E. The first crankshaft receiving portion 34A is a bearing portion for supporting the first crank journal 51A, and is configured by the first partition wall 32A and the associated crank cap 33. The second crankshaft receiving portion 34B is a bearing portion for supporting the second crank journal 51B, and is configured by the second partition wall 32B and the associated crank cap 33. The third crankshaft receiving portion 34C is a bearing portion for supporting the third crank journal 51C, and is configured by the third partition wall 32C and the associated crank cap 33. The fourth crankshaft receiving portion 34D is a bearing portion for supporting the fourth crank journal 51D, and is configured by the fourth partition wall 32D and the associated crank cap 33. The fifth crankshaft receiving portion 34E is a bearing portion for supporting the fifth crank journal 51E, and is configured by the fifth partition wall 32E and the associated crank cap 33.

Each crankshaft receiving portion 34 is provided with a crank bearing 6 to reduce friction caused by rotation of the crankshaft 5. That is, as the crank bearings 6, a first crank bearing 6A, which supports the first crank journal 51A, a second crank bearing 6B, which supports the second crank journal 51B, a third crank bearing 6C, which supports the third crank journal 51C, a fourth crank bearing 6D, which supports the fourth crank journal 51D, and a fifth crank bearing 6E, which supports the fifth crank journal 51E, are provided. The crank bearings 6 are split slide bearings each configured by an upper bearing 7, which serves as a semicircular main bearing body attached to the corresponding partition wall 32, and a lower bearing 8, which serves as a semicircular sub-bearing body attached to the corresponding crank cap 33. Each crank bearing 6 is configured such that a gap (oil clearance 60) is formed between its inner circumferential surface and the outer circumferential surface 51Z of the crank journal 51 in a state where the crank bearing 6 supports the crank journal 51. A bearing oil groove 32R for supplying the engine oil 41 in a third main body oil passage 35C to an oil hole 77 (first oil passage) of the upper bearing 7 is provided at the bearing portion of each partition wall 32.

Each connecting rod 27 is configured by a connecting rod main body 27A, on which the associated piston 26 is mounted, and a connecting rod cap 27B, which is attached to the end portion of the connecting rod main body 27A. Each connecting rod 27 is provided with a connecting rod bearing portion 27C for mounting the connecting rod 27 on the crankshaft 5 to be rotatable with respect to the crankshaft 5. The connecting rod bearing portion 27C is provided with a connecting rod bearing 28 for reducing friction caused by rotation of the crankshaft 5. The connecting rod bearing 28 is a split slide bearing configured by a semicircular upper bearing 28A, which is attached to the connecting rod main body 27A, and a semicircular lower bearing 28B, which is attached to the connecting rod cap 27B. The connecting rod bearing 28 is configured such that a gap (oil clearance 29 (see FIG. 5)) is formed between its inner circumferential surface and the outer circumferential surface of the crank pin 52 in a state where the connecting rod bearing 28 supports the crank pin 52.

[3] Lubricating Structure of Engine 1

The lubricating structure of the crankshaft 5 will now be described with reference to FIGS. 1 and 3.

As shown in FIG. 1, the cylinder block 3 has a main oil body passage 35 for supplying the engine oil 41 discharged from the oil pump 42 to each part of the engine 1. The main body oil passage 35 includes a first main body oil passage 35A, a second main body oil passage 35B, and third main body oil passages 35C. The first main body oil passage 35A is an oil passage for permitting the engine oil 41 outside the cylinder block 3 to flow into the second main body oil passage 35B. The second main body oil passage 35B is an oil passage for distributing the engine oil 41 supplied from the first main body oil passage 35A to the third main body oil passages 35C. The third main body oil passages 35C are oil passages for supplying the engine oil 41 supplied from the second main body oil passage 35B to the crank bearings 6 of the crankshaft receiving portions 34.

As shown in FIG. 3, a crank oil passage 55 is provided inside the crankshaft 5. The crank oil passage 55 supplies the engine oil 41 from the oil clearances 60 of the crank bearings 6 to the oil clearances 29 of the connecting rod bearings 28. The crank oil passage 55 includes a first crank oil passage 55A, a second crank oil passage 55B, a third crank oil passage 55C, and a fourth crank oil passage 55D. Each crank oil passage 55 includes an inlet oil passage 55J for permitting the engine oil 41 in the oil clearance 60 of the associated crank bearing 6 to flow to the inside of the crank journal 51 and an outlet oil passage 55P for permitting the engine oil 41 in the inlet oil passage 55J to flow to the oil clearance 29 of the associated connecting rod bearing 28.

The first crank oil passage 55A includes a first inlet oil passage 55JA, which is provided in the first crank journal 51A, and a first outlet oil passage 55PA, which is provided in the associated crank arm 53 and the first crank pin 52A. The second crank oil passage 55B includes a second inlet oil passage 55JB, which is provided in the second crank journal 51B, and a second outlet oil passage 55PB, which is provided in the associated crank arm 53 and the second crank pin 52B. The third crank oil passage 55C includes a third inlet oil passage 55JC, which is provided in the third crank journal 51C, and a third outlet oil passage 55PC, which is provided in the associated crank arm 53 and the third crank pin 52C. The fourth crank oil passage 55D includes a fourth inlet oil passage 55JD, which is provided in the fourth crank journal 51D, and a fourth outlet oil passage 55PD, which is provided in the associated crank arm 53 and the fourth crank pin 52D.

The flow of the engine oil 41 for lubricating the crankshaft 5 will now be described with reference to FIG. 5. FIG. 5 schematically shows the main body oil passage 35 and the crank oil passage 55.

The engine oil 41 retained in the oil pan 13 is drawn into the oil pump 42 via the oil strainer 43. The engine oil 41 is discharged from the oil pump 42 and flows into the first main body oil passage 35A via the oil filter 44. The engine oil 41 in the first main body oil passage 35A flows through the second main body oil passage 35B into the third main body oil passages 35C. The engine oil 41 in each third main body oil passage 35C flows into the oil clearance 60 via the bearing oil groove 32R of the associated partition wall 32 and the oil hole 77 of the associated crank bearing 6. The engine oil 41 in the oil clearance 60 flows into the crank journal 51 via the inlet of the associated inlet oil passage 55J. The engine oil 41 in the inlet oil passage 55J flows into the oil clearance 29 of the associated connecting rod bearing 28 via the associated outlet oil passage 55P.

[4] Structure of Crank Bearing 6

Figure 6:
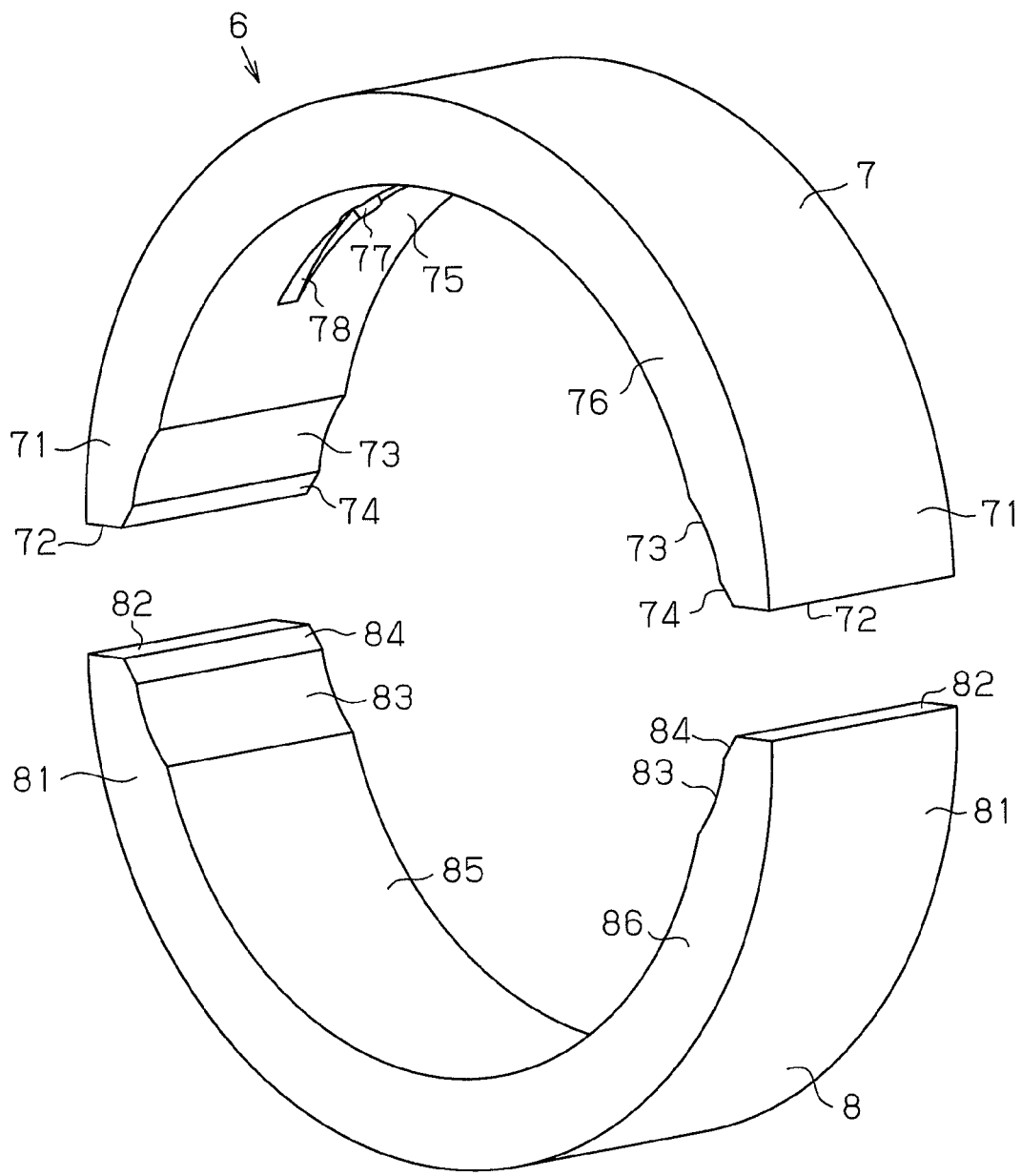
FIG. 6 is a perspective view illustrating the state where the crank bearing of the first embodiment is divided into an upper bearing and a lower bearing.
Figure 7:
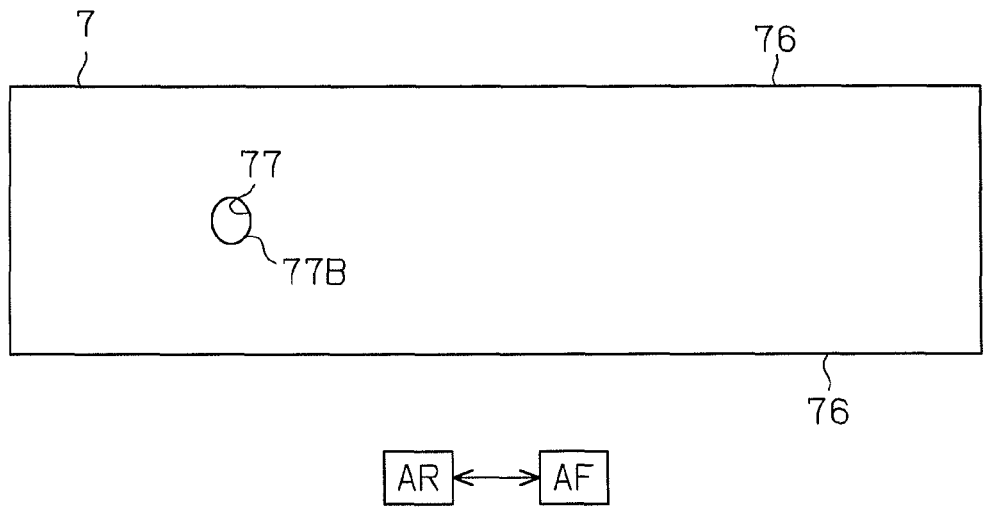
FIG. 7 is a plan view illustrating the upper bearing of FIG. 6.
Figure 8:
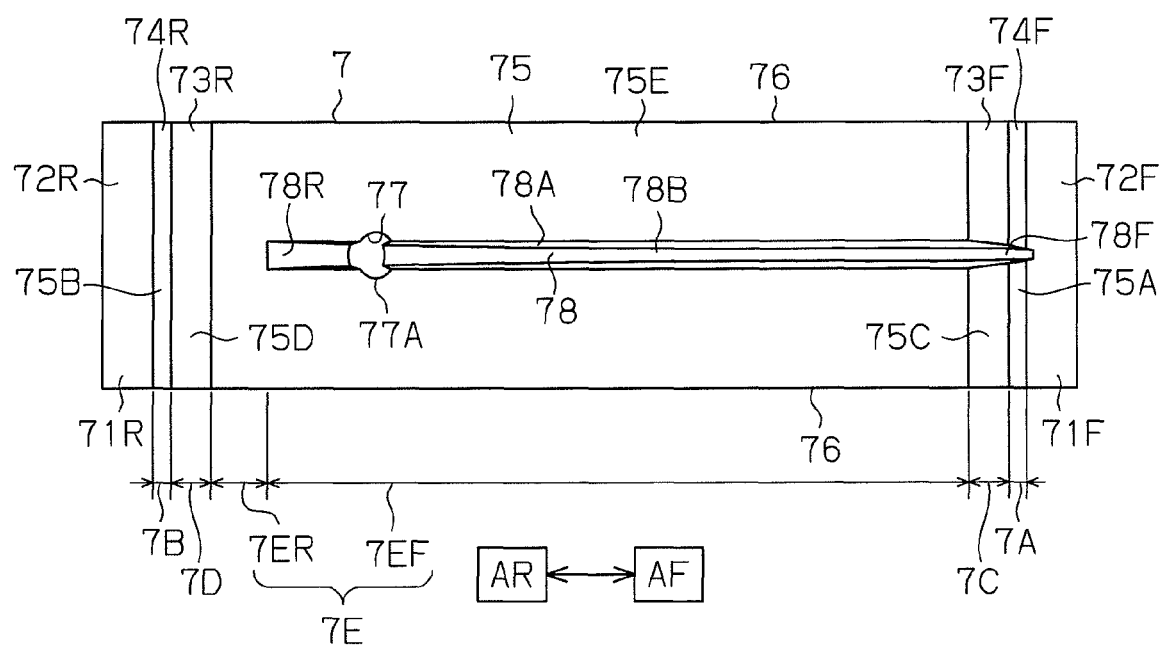
FIG. 8 is a bottom view illustrating the upper bearing of FIG. 6.
Figure 9:
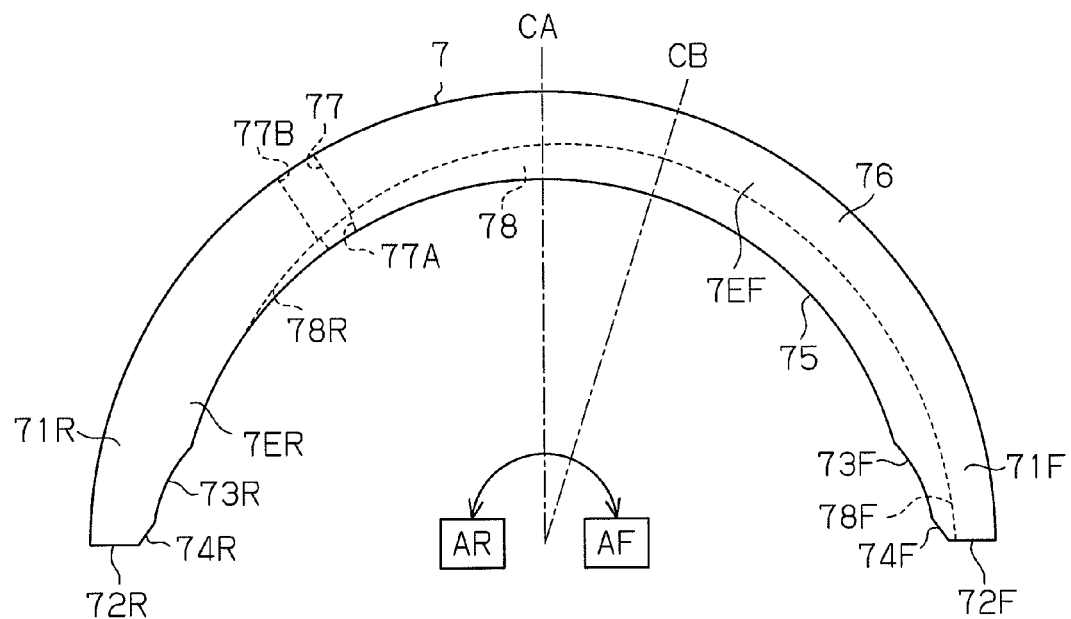
FIG. 9 is a front view illustrating the upper bearing of FIG. 6.
Figure 10:
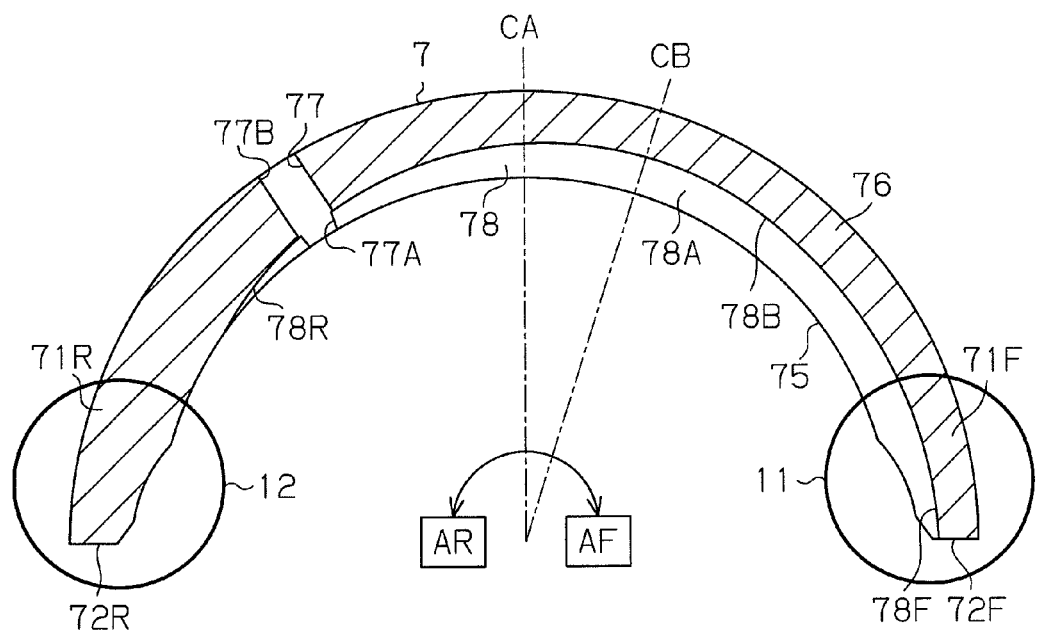
FIG. 10 is a cross-sectional view illustrating the upper bearing of FIG. 6.
Figure 11:
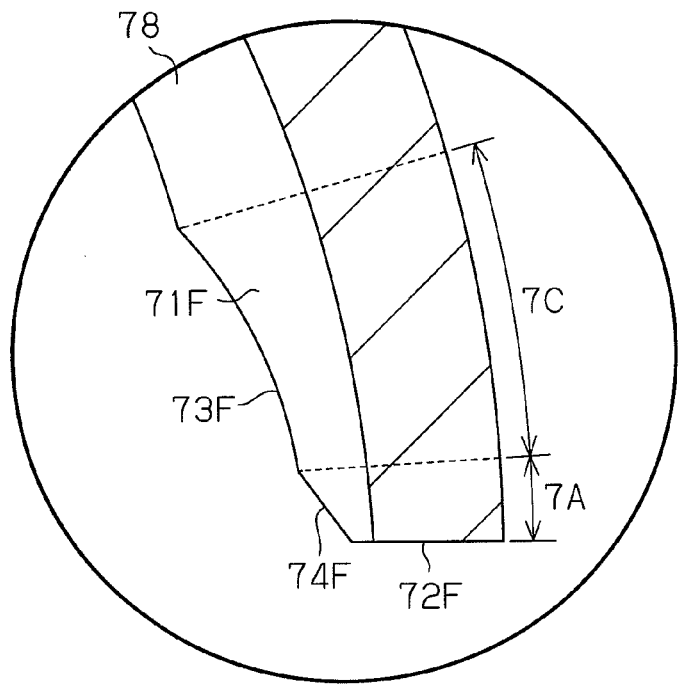
FIG. 11 is an enlarged view illustrating the part surrounded by circle 11 in FIG. 10.
Figure 12:
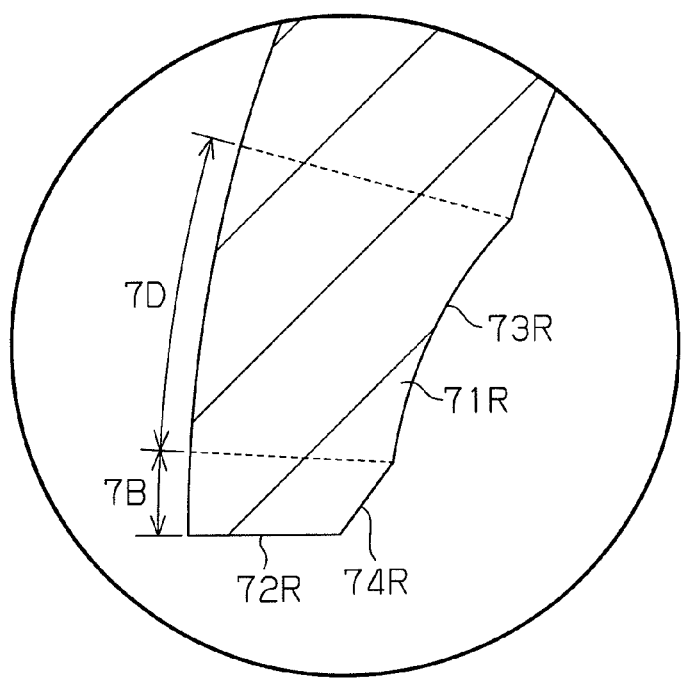
FIG. 12 is an enlarged view illustrating the part surrounded by circle 12 in FIG. 10.
Figure 13:
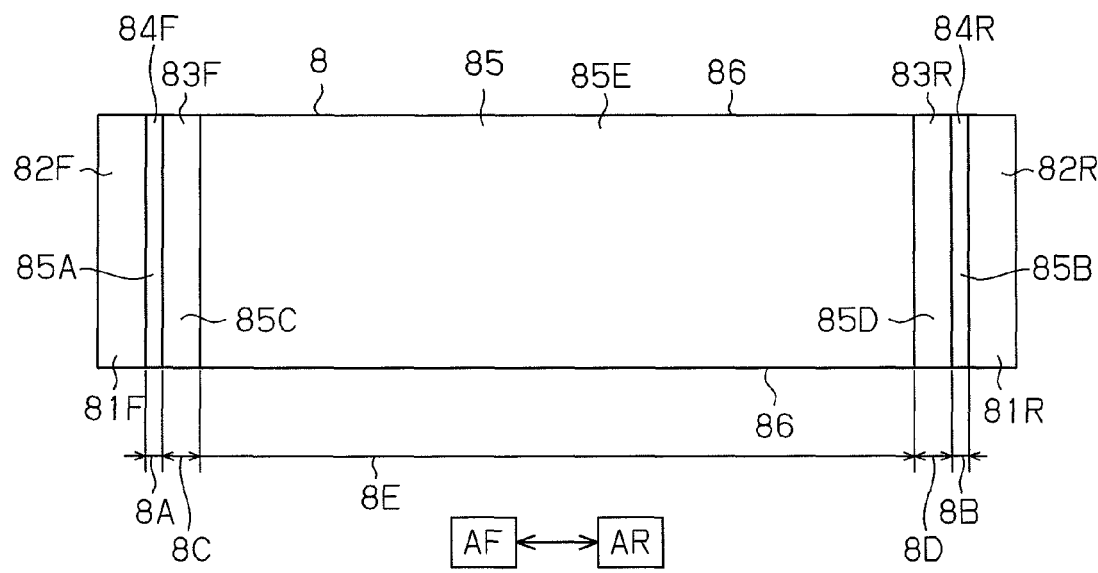
FIG. 13 is a plan view illustrating the inner circumferential surface of the lower bearing of FIG. 6.
Figure 14:
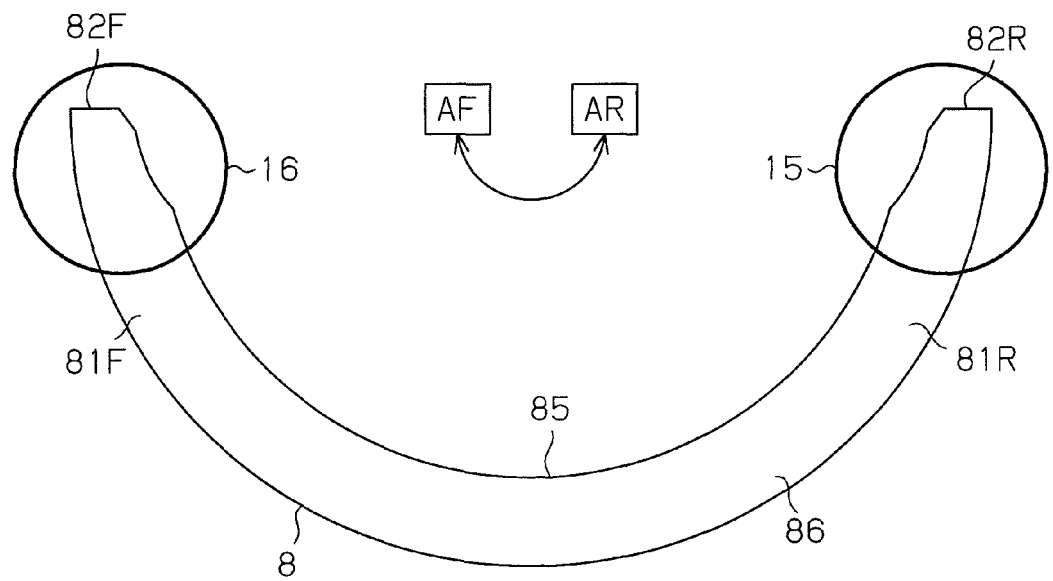
FIG. 14 is a front view illustrating the lower bearing of FIG. 6.
Figure 15:
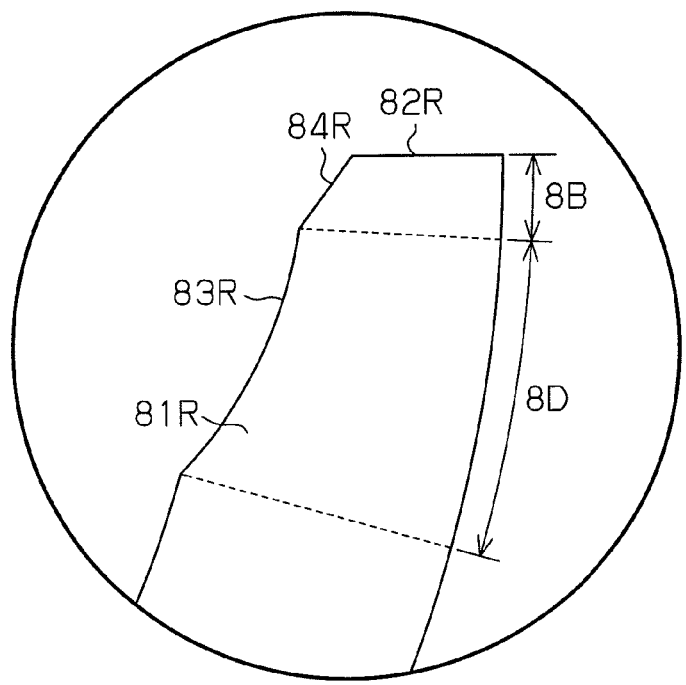
FIG. 15 is an enlarged view illustrating the part surrounded by circle 15 in FIG. 14.
Figure 16:
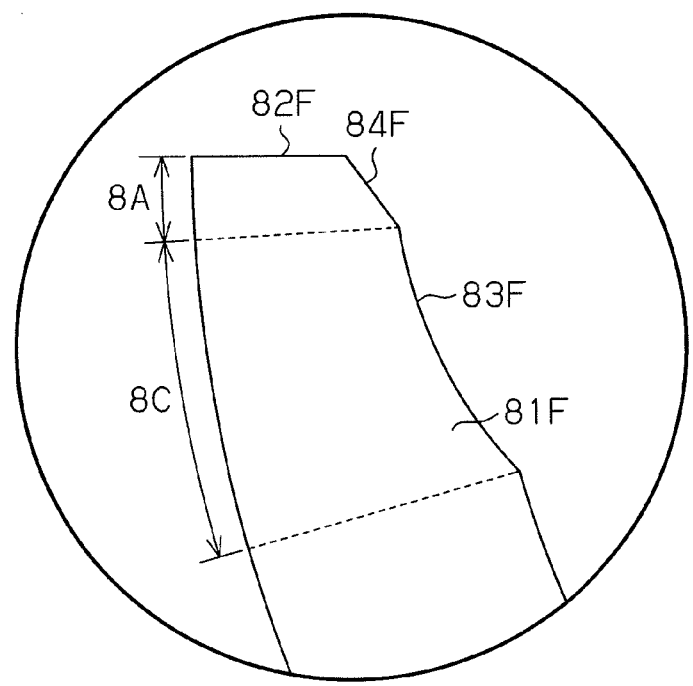
FIG. 16 is an enlarged view illustrating the part surrounded by circle 16 in FIG. 14.

The specific structure of the crank bearings 6 will be described with reference to FIGS. 6 to 16. FIG. 6 shows the state where one of the crank bearings 6 is divided into the upper bearing 7 and the lower bearing 8. FIG. 7 shows the structure of the upper bearing 7 as viewed from top. FIG. 8 shows the structure of the upper bearing 7 as viewed from the bottom. FIG. 9 shows the structure of the upper bearing 7 as viewed from the front. FIG. 10 shows the cross-sectional structure of the upper bearing 7 along the radial direction. FIGS. 11 and 12 show the partially enlarged view of FIG. 10. FIG. 13 shows the structure of the lower bearing 8 as viewed from the front. FIG. 14 shows the structure of the lower bearing 8 as viewed from the front. FIGS. 15 and 16 are partially enlarged view of FIG. 14. Also, in each of the drawings, the sizes of the chamfers and the crush reliefs are exaggerated as compared to other region of the crank bearing 6.

As shown in FIG. 6, the crank bearing 6 is configured by combination of the upper bearing 7 and the lower bearing 8. More specifically, the bearings 7, 8 are combined such that a pair of matching surfaces 72 of the upper bearing 7 contact a pair of matching surfaces 82 of the lower bearing 8. Hereinafter, when any position on each of the upper bearing 7 and the lower bearing 8 is taken as a reference, the leading direction in the rotation direction of the crankshaft 5 from the reference position in the circumferential direction of each of the bearings 7, 8 is referred to as a rotation leading direction AF, and the trailing direction in the rotation direction of the crankshaft 5 from the reference position in the circumferential direction of each of the bearings 7, 8 is referred to as a rotation trailing direction AR.

As shown in FIGS. 7 to 12, the oil hole 77 for permitting the engine oil 41 to flow between the outer circumference and the inner circumference of each crank bearing 6, and an oil groove 78, which functions as a second oil passage, for permitting the engine oil 41 to flow in the circumferential direction on the inner circumference of the crank bearing 6 are provided in the upper bearing 7. A crush relief 73 is provided on each of a pair of end portions 71 of the upper bearing 7 on an inner circumferential surface 75. The crush reliefs 73 permit deformation of the end portions 71 caused by combining the upper bearing 7 and the lower bearing 8. A chamfer 74 is provided on one of the edges of each matching surface 72 located on the inner circumference of the upper bearing 7. A middle bearing section 7E for forming a film (oil film) of the engine oil 41 suitable for supporting the crank journal 51 is provided between the end portions 71 in the circumferential direction. The middle bearing section 7E is provided with an undercut portion 7EF including the oil groove 78, which is an oil passage for the engine oil 41, and a non-undercut portion 7ER in which no oil passage is formed.

The matching surface 72 of the end portion 71 (leading end portion 71F) in the leading direction AF is referred to as a leading side matching surface 72F, and the matching surface 72 of the end portion 71 (trailing end portion 71R) in the trailing direction AR is referred to as a trailing side matching surface 72R. The crush relief 73 of the leading end portion 71F is referred to as a leading side crush relief 73F. The chamfer 74 of the leading end portion 71F is referred to as a leading side chamfer 74F. The crush relief 73 of the trailing end portion 71R is referred to as a trailing side crush relief 73R. The chamfer 74 of the trailing end portion 71R is referred to as a trailing side chamfer 74R.

The crush reliefs 73 are formed such that the depth is the greatest at the matching surfaces 72. The crush reliefs 73 are formed such that the depth is gradually reduced from the matching surfaces 72 toward the middle portion of the upper bearing 7 in the circumferential direction, and the depth becomes zero at the position furthest from the matching surfaces 72 in the circumferential direction. The depth of the crush reliefs 73 refers to the cutting amount on the inner circumferential surface 75 in the radial direction.

The chamfers 74 extend along the axial direction of each crank bearing 6 from one of side surfaces 76 of the upper bearing 7 to the other side surface 76. The leading side chamfer 74F extends to connect the oil groove 78 to the side surfaces 76.

The oil hole 77 extends through the upper bearing 7 in the radial direction, and connects an inner circumference opening 77A, which is an opening on the inner circumference, to an outer circumference opening 77B, which is an opening on the outer circumference. The oil hole 77 is provided on the side in the trailing direction AR of the center (circumferential center CA) of the upper bearing 7 in the circumferential direction.

The oil groove 78 extends from a region between the inner circumference opening 77A and the non-undercut portion 7ER to the leading side matching surface 72F. More specifically, when the end portion of the oil groove 78 in the leading direction AF is referred to as a leading end portion 78F, and the end portion of the oil groove 78 in the trailing direction AR is referred to as a trailing end portion 78R, the leading end portion 78F is open toward the outside of the upper bearing 7 on the leading side matching surface 72F, and the trailing end portion 78R ends immediately before the non-undercut portion 7ER. The oil groove 78 extends to connect the oil hole 77, the leading side crush relief 73F, to the leading side chamfer 74F. The center of the oil groove 78 in the circumferential direction (circumferential center CB) is located on the side in the leading direction AF of the circumferential center CA of the upper bearing 7. The oil groove 78 is formed by a pair of oil groove side surfaces 78A and an oil groove bottom surface 78B, which connects the oil groove side surfaces 78A. The oil groove side surfaces 78A are formed to extend from the radially outward side of the crank bearing 6 to the radially inner side of the crank bearing 6 to be separate from each other. The width of the oil groove 78 is less than the radius of the oil hole 77 (radius of the inner circumference opening 77A). The depth of the oil groove 78 is the greatest at the circumferential center CB, and is gradually reduced from the circumferential center CB toward the trailing end portion 78R. The depth of the oil groove 78 is set to become zero at the trailing end portion 78R. The depth of the oil groove 78 is set to be gradually reduced from the circumferential center CB toward the leading end portion 78F.

The non-undercut portion 7ER is located on the side in the trailing direction AR of the inner circumference opening 77A and on the side in the leading direction AF of the trailing side crush relief 73R. That is, in the upper bearing 7, the region between the trailing end portion 78R of the oil groove 78 and the trailing side crush relief 73R corresponds to the non-undercut portion 7ER.

As shown in FIG. 8, the upper bearing 7 is divided in the circumferential direction as follows. That is, the upper bearing 7 can be divided into a first chamfered section 7A, in which the leading side chamfer 74F is provided, a second chamfered section 7B, in which the trailing side chamfer 74R is provided, a first relief section 7C, in which the leading side crush relief 73F is provided, a second relief section 7D, in which the trailing side crush relief 73R is provided, and the middle bearing section 7E, in which the inner circumference opening 77A of the oil hole 77 is provided. The inner circumferential surface 75 of the upper bearing 7 can be divided as follows based on the division of the upper bearing 7. That is, the inner circumferential surface 75 is divided into the oil groove bottom surface 78B, an inner circumferential surface 75A of the first chamfered section 7A excluding the oil groove bottom surface 78B, an inner circumferential surface 75B of the second chamfered section 7B, an inner circumferential surface 75C of the first relief section 7C excluding the oil groove bottom surface 78B, an inner circumferential surface 75D of the second relief section 7D, and an inner circumferential surface 75E of the middle bearing section 7E excluding the oil groove bottom surface 78B.

As shown in FIGS. 13 to 16, a crush relief 83 is provided on each of a pair of end portions 81 of the lower bearing 8 on the inner circumferential surface 85. The crush reliefs 83 permit deformation of the end portions 81 caused by combining the upper bearing 7 and the lower bearing 8. A chamfer 84 is provided on one of the edges of each matching surface 82 located on the inner circumference of the lower bearing 8. A middle bearing section 8E for forming a film (oil film) of the engine oil 41 suitable for supporting the crank journal 51 is provided between the end portions 81 in the circumferential direction.

The matching surface 82 of the end portion (leading end portion 81F) in the leading direction AF is referred to as a leading side matching surface 82F, and the matching surface 82 of the end portion (trailing end portions 81R) in the trailing direction AR is referred to as a trailing side matching surface 82R. The crush relief 83 of the leading end portion 81F is referred to as a leading side crush relief 83F. The chamfer 84 of the leading end portion 81F is referred to as a leading side chamfer 84F. The crush relief 83 of the trailing end portion 81R is referred to as a trailing side crush relief 83R. The chamfer 84 of the trailing end portion 81R is referred to as a trailing side chamfer 84R.

The crush reliefs 83 are formed such that the depth is the greatest at the matching surfaces 82. The crush reliefs 83 are formed such that the depth is gradually reduced from the matching surfaces 82 toward the middle portion of the lower bearing 8 in the circumferential direction, and the depth becomes zero at the position furthest from the matching surfaces 82 in the circumferential direction. The depth of the crush reliefs 83 refers to the cutting amount on the inner circumferential surface 85 in the radial direction. The chamfers 84 extend along the axial direction of each crank bearing 6 from one of side surfaces 86 of the lower bearing 8 to the other side surface 86.

As shown in FIG. 13, the lower bearing 8 can be divided in the circumferential direction as follows. That is, the lower bearing 8 is divided into a first chamfered section 8A, in which the leading side chamfer 84F is provided, a second chamfered section 8B, in which the trailing side chamfer 84R is provided, a first relief section 8C, in which the leading side crush relief 83F is provided, a second relief section 8D, in which the trailing side crush relief 83R is provided, and a middle bearing section 8E, which is provided between the first relief section 8C and the second relief section 8D. The inner circumferential surface 85 of the lower bearing 8 can be divided as follows based on the division of the lower bearing 8. That is, the inner circumferential surface 85 is divided into an inner circumferential surface 85A of the first chamfered section 8A, an inner circumferential surface 85B of the second chamfered section 8B, an inner circumferential surface 85C of the first relief section 8C, an inner circumferential surface 85D of the second relief section 8D, and an inner circumferential surface 85E of the middle bearing section 8E.

[5] Oil Clearance of Crank Bearing

In the engine 1, the oil clearance 60 is formed between each crank bearing 6 and the corresponding crank journal 51 since the crank journal 51 is supported by the crank bearing 6. That is, the oil clearance 60 is formed between the inner circumferential surfaces 75, 85 of the upper and lower bearings 7, 8 and the outer circumferential surface 51Z of the crank journal 51.

Figure 19:
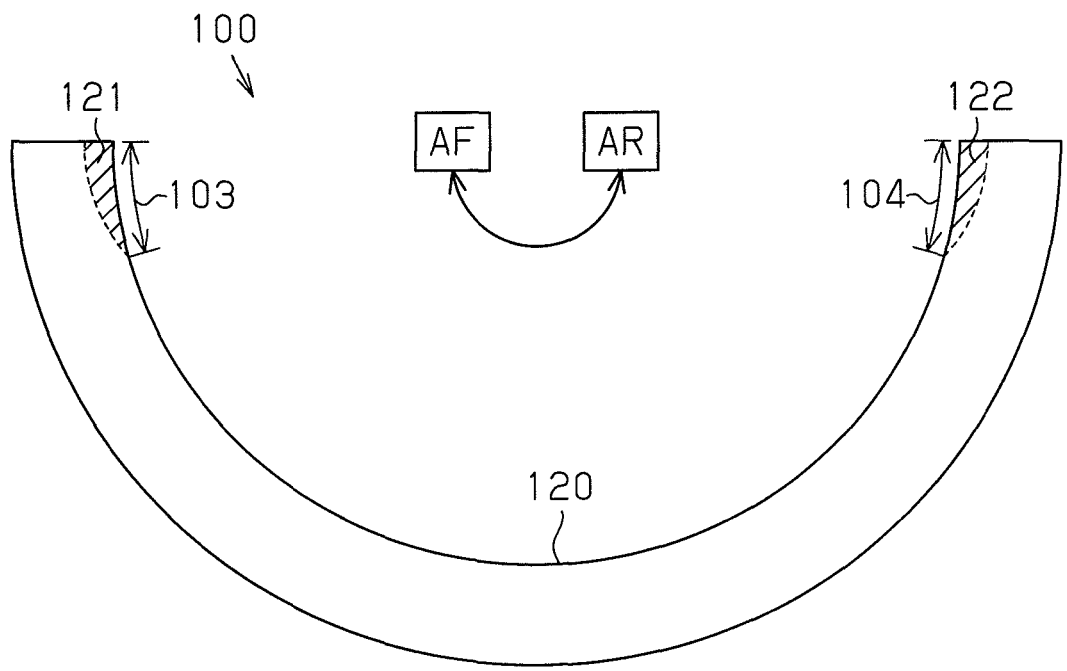
FIG. 19 is a front view illustrating a lower bearing of the first imaginary bearing.
Figure 20:
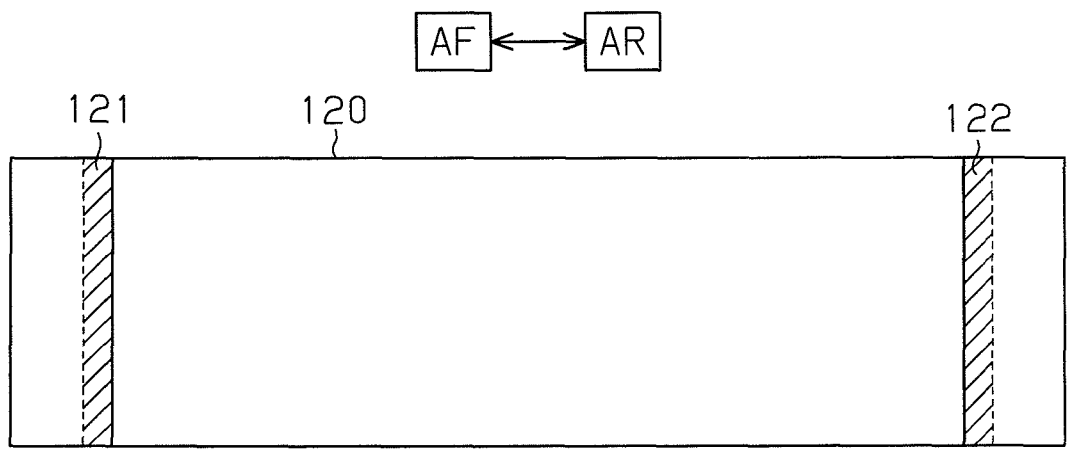
FIG. 20 is a plan view illustrating the inner circumferential surface of the lower bearing of FIG. 19.
Figure 23:
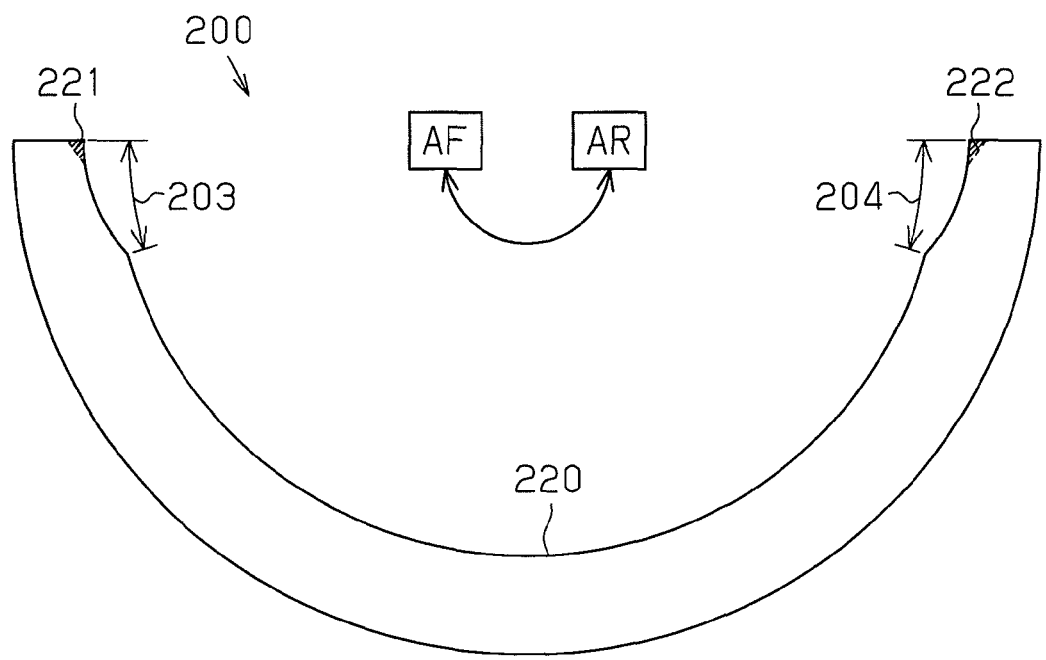
FIG. 23 is a front view illustrating a lower bearing of the second imaginary bearing.
Figure 24:
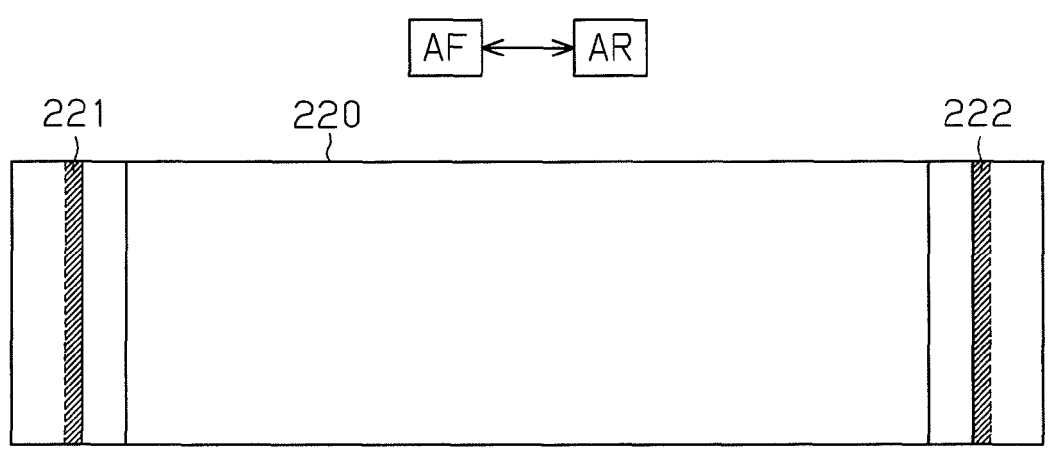
FIG. 24 is a plan view illustrating the inner circumferential surface of the lower bearing of FIG. 23.

As a preface for describing the details of the oil clearance 60, an imaginary crank bearing (first imaginary bearing 100)

shown in FIGS. 17 to 20 and an imaginary crank bearing (second imaginary bearing 200) as shown in FIGS. 21 to 24 will be described. FIG. 17 shows the structure of an upper bearing 110 of the first imaginary bearing 100 as viewed from the front. FIG. 18 shows the structure of the upper bearing 110 as viewed from the bottom. FIG. 19 shows the structure of a lower bearing 120 of the first imaginary bearing 100 as viewed from the front. FIG. 20 shows the structure of the lower bearing 120 as viewed from the top. FIG. 21 shows the structure of an upper bearing 210 of the second imaginary bearing 200 as viewed from the front. FIG. 22 shows the structure of the upper bearing 210 as viewed from the bottom. FIG. 23 is the structure of a lower bearing 220 of the second imaginary bearing 200 as viewed from the front. FIG. 24 is the structure of the lower bearing 220 as viewed from the top. The components of the crank bearings 100, 200 that are the same as those of the crank bearing 6 are given the same reference numerals.

The first imaginary bearing 100 has the same structure as the crank bearing 6 except that the crush reliefs 73, 83, the chamfers 74, 84, and the oil groove 78 are not provided. The second imaginary bearing 200 has the same structure as the crank bearing 6 except that the chamfers 74, 84, and the oil groove 78 are not provided.

The structure of the first imaginary bearing 100 becomes the same as the structure of the second imaginary bearing 200 by providing the leading side crush relief 73F and the trailing side crush relief 73R on the upper bearing 110, and providing the leading side crush relief 83F and the trailing side crush relief 83R on the lower bearing 120. Masses removed from the first imaginary bearing 100 by forming the crush reliefs 73, 83 on the bearing 100 are specified as follows. That is, a mass removed from the upper bearing 110 by forming the leading side crush relief 73F on the upper bearing 110 is referred to as a first leading side relief body 111. A mass removed from the upper bearing 110 by forming the trailing side crush relief 73R on the upper bearing 110 is referred to as a first trailing side relief body 112. A mass removed from the lower bearing 120 by forming the leading side crush relief 83F on the lower bearing 120 is referred to as a second leading side relief body 121. A mass removed from the lower bearing 120 by forming the trailing side crush relief 83R on the lower bearing 120 is referred to as a second trailing side relief body 122.

The structure of the second imaginary bearing 200 becomes the same as the crank bearing 6 by providing the leading side chamfer 74F, the trailing side chamfer 74R, and the oil groove 78 on the upper bearing 210, and providing the leading side chamfer 84F and the trailing side chamfer 84R on the lower bearing 220. Masses removed from the bearing 200 by forming the chamfers 74, 84 on the second imaginary bearing 200 are specified as follows. That is, a mass removed from the upper bearing 210 by forming the leading side chamfer 74F on the upper bearing 210 is referred to as a first leading side chamfer body 211. A mass removed from the upper bearing 210 by forming the trailing side chamfer 74R on the upper bearing 210 is referred to as a first trailing side chamfer body 212. A mass removed from the lower bearing 220 by forming the leading side chamfer 84F on the lower bearing 220 is referred to as a second leading side chamfer body 221. A mass removed from the lower bearing 220 by forming the trailing side chamfer 84R on the lower bearing 220 is referred to as a second trailing side chamfer body 222.

Figure 25:
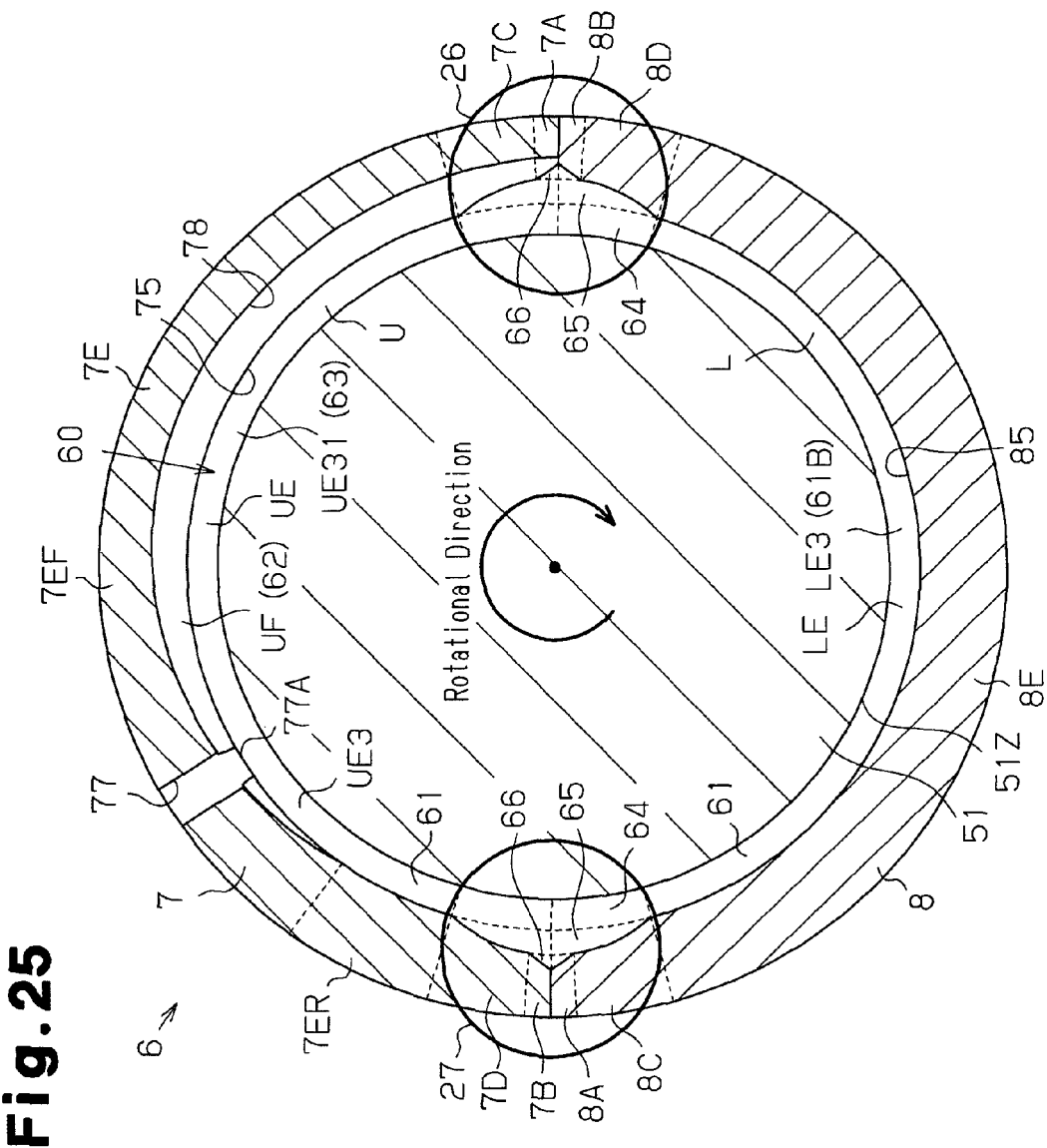
FIG. 25 is a cross-sectional view illustrating the crank journal and the surrounding structure of the engine of FIG. 1.
Figure 26:
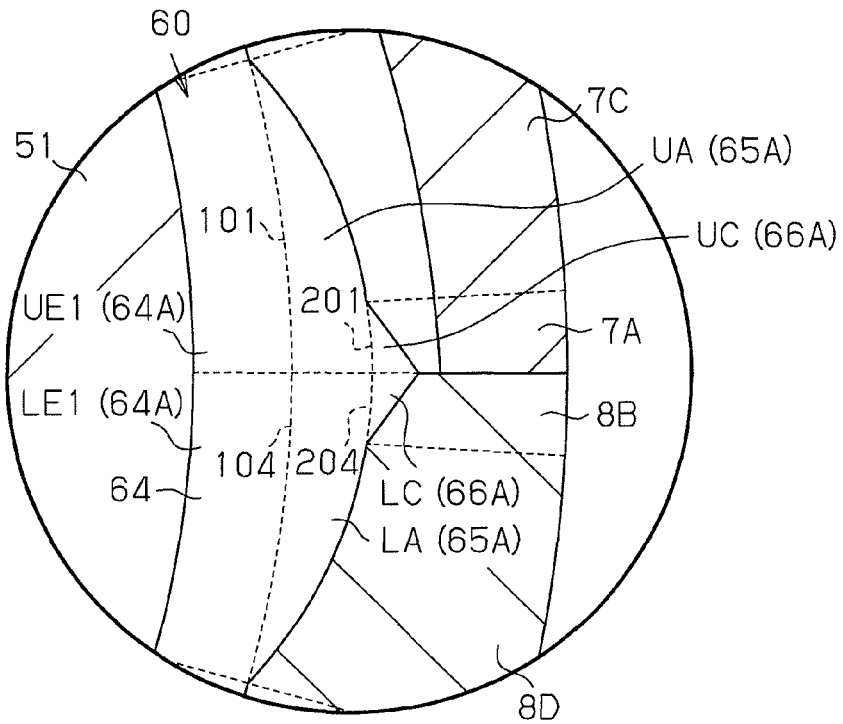
FIG. 26 is an enlarged view illustrating the part surrounded by circle 26 in FIG. 25.
Figure 27:
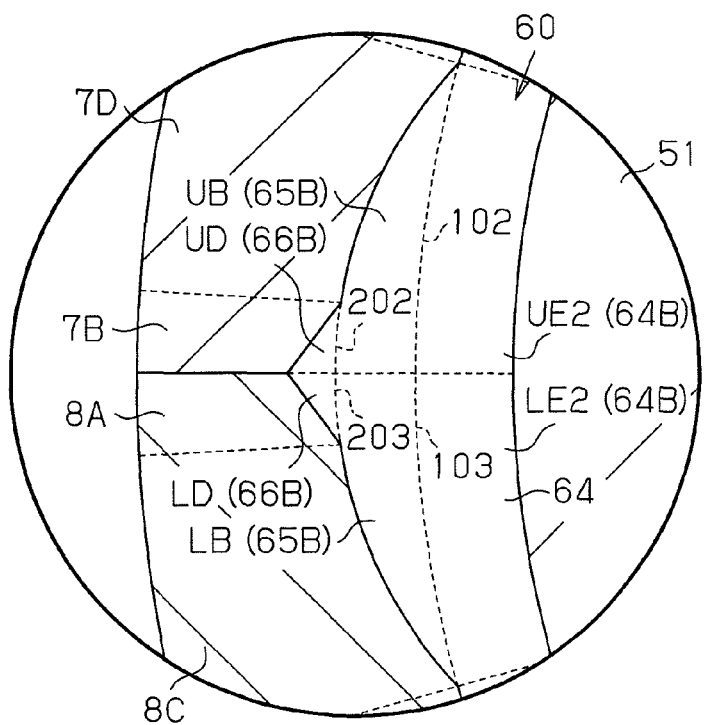
FIG. 27 is an enlarged view illustrating the part surrounded by circle 27 in FIG. 25.

The details of the oil clearance 60 of each crank bearing 6 will be described with reference to FIGS. 25 to 28. FIG. 25 shows the cross-sectional structure of a state where the crank journal 51 is supported by the crank bearings 6, 100, 200, and the state where the centers of the crank bearings 6, 100, 200 are aligned with the center of the crank journal 51. In each of the drawings, the sizes of the crank bearing 6 and the oil clearance 60 with respect to the crank journal 51 is exaggerated.

The oil clearance 60 of each crank bearing 6 is broadly divided into a first zone U formed between the upper bearing 7 and the crank journal 51, and a second zone L formed between the lower bearing 8 and the crank journal 51.

The first zone U is further divided as follows. That is, the first zone U is divided into a zone UA corresponding to the first leading side relief body 111, a zone UB corresponding to the first trailing side relief body 112, a zone UC corresponding to the first leading side chamfer body 211, a zone UD corresponding to the first trailing side chamfer body 212, a zone UE formed between the outer circumferential surface 51Z of the crank journal 51 and the inner circumferential surface 75 of the upper bearing 110 of the first imaginary bearing 100, and a zone UF corresponding to the oil groove 78. The zone UE is further divided as follows. That is, the zone UE is divided into a zone UE1 corresponding to the first chamfered section 7A and the first relief section 7C, a zone UE2 corresponding to the second chamfered section 7B and the second relief section 7D, and a zone UE3 corresponding to the middle bearing section 7E. As shown in FIG. 28, the zone UE3 is further divided as follows. That is, the zone UE3 is divided into a zone UE31 corresponding to the oil groove 78 and a zone UE32 corresponding to the zone where the oil groove 78 is not formed.

The zone L corresponding to the lower bearing 8 is further divided as follows. That is, the zone L is divided into a zone LA corresponding to the second leading side relief body 121, a zone LB corresponding to the second trailing side relief body 122, a zone LC corresponding to the second leading side chamfer body 221, a zone LD corresponding to the second trailing side chamfer body 222, a zone LE formed between the outer circumferential surface 51Z of the crank journal 51 and the inner circumferential surface 75 of the lower bearing 120 of the first imaginary bearing 100. The zone LE is further divided as follows. That is, the zone LE is divided into a zone LE1 corresponding to the second chamfered section 8B and the second relief section 8D, a zone LE2 corresponding to the first chamfered section 8A and the first relief section 8C, and a zone LE3 corresponding to the middle bearing section 8E.

The oil clearance 60 is provided with a bearing oil passage 61, which generates oil film pressure necessary for appropriately supporting rotation of the crank journal 51, an in-groove oil passage 62 having significantly small oil film pressure compared to the bearing oil passages 61, a groove facing oil passage 63, an end oil passage 64, a relief oil passage 65, and a chamfer oil passage 66. More specifically, the oil passages are formed as follows. Hereinafter, the inner circumferential surface 75 of the first imaginary bearing 100 corresponding to the first chamfered section 7A and the first relief section 7C of the upper bearing 7 is referred to as an imaginary inner circumferential surface 101. The inner circumferential surface 75 of the first imaginary bearing 100 corresponding to the second chamfered section 7B and the second relief section 7D of the upper bearing 7 is referred to as an imaginary inner circumferential surface 102. The inner circumferential surface 75 of the first imaginary bearing 100 corresponding to the first chamfered section 8A and the first relief section 8C of the lower bearing 8 is referred to as an imaginary inner circumferential surface 103. The inner circumferential surface 75 of the first imaginary bearing 100 corresponding to the second chamfered section 8B and the second relief section 8D of the lower bearing 8 is referred to as an imaginary inner circumferential surface 104. The inner circumferential surface 75 of the second imaginary bearing 200 corresponding to the first chamfered section 7A and the first relief section 7C of the upper bearing 7 is referred to as an imaginary inner circumferential surface 201. The inner circumferential surface 75 of the second imaginary bearing 200 corresponding to the second chamfered section 7B and the second relief section 7D of the upper bearing 7 is referred to as an imaginary inner circumferential surface 202. The inner circumferential surface 75 of the second imaginary bearing 200 corresponding to the first chamfered section 8A and the first relief section 8C of the lower bearing 8 is referred to as an imaginary inner circumferential surface 203. The inner circumferential surface 75 of the second imaginary bearing 200 corresponding to the second chamfered section 8B and the second relief section 8D of the lower bearing 8 is referred to as an imaginary inner circumferential surface 204.

The bearing oil passage 61 includes a first bearing oil passage 61A located between the inner circumferential surface 75E of the middle bearing section 7E of the upper bearing 7 and the outer circumferential surface 51Z of the crank journal 51, and a second bearing oil passage 61B located between the inner circumferential surface 85E of the middle bearing section 8E of the lower bearing 8 and the outer circumferential surface 51Z of the crank journal 51.

The end oil passage 64 includes a first end oil passage 64A located between the imaginary inner circumferential surfaces 101, 104 of the first imaginary bearing 100 and the outer circumferential surface 51Z of the crank journal 51, and a second end oil passage 64B located between the imaginary inner circumferential surfaces 102, 103 of the first imaginary bearing 100 and the outer circumferential surface 51Z of the crank journal 51.

The relief oil passage 65 includes a first relief oil passage 65A located between the imaginary inner circumferential surface 201, 204 of the second imaginary bearing 200 and the imaginary inner circumferential surfaces 101, 104 of the first imaginary bearing 100, and a second relief oil passage 65B located between the imaginary inner circumferential surfaces 202, 203 of the second imaginary bearing 200 and the imaginary inner circumferential surfaces 102, 103 of the first imaginary bearing 100.

The chamfer oil passage 66 includes a first chamfer oil passage 66A and a second chamfer oil passage 66B. The first chamfer oil passage 66A is located between the imaginary inner circumferential surface 204 of the second imaginary bearing 200 and the inner circumferential surfaces 75A, 85B of the first chamfered section 7A of the upper bearing 7 and the second chamfered section 8B of the lower bearing 8, and the imaginary inner circumferential surface 201. The second chamfer oil passage 66B is located between the inner circumferential surfaces 75B, 85A of the second chamfered section 7B of the upper bearing 7 and the first chamfered section 8A of the lower bearing 8 and the imaginary inner circumferential surfaces 202, 203 of the second imaginary bearing 200. The chamfer oil passage 66 corresponds to an auxiliary oil passage provided at the matching portion of the crank bearing 6.

The oil passages may be expressed as follows based on the aforementioned divided zones of the oil clearance 60. That is, the first bearing oil passage 61A is formed by the zone UE32. The second bearing oil passage 61B is formed by the zone LE3. The in-groove oil passage 62 is formed by the zone UF. The groove facing oil passage 63 is formed by the zone UE31. The first end oil passage 64A is formed by the zone UE1 and the zone LE1. The second end oil passage 64B is formed by the zone UE2 and the zone LE2. The first relief oil passage 65A is formed by the zone UA and the zone LA. The second relief oil passage 65B is formed by the zone UB and the zone LB. The first chamfer oil passage 66A is formed by the zone UC and the zone LC. The second chamfer oil passage 66B is formed by the zone UD and the zone LD.

[6] Flow of Engine Oil in Oil Clearance

The flowing manner of the engine oil 41 in the oil clearance 60 of each crank bearing 6 will now be described with reference to FIGS. 25 to 28.

A force that acts from trailing direction AR toward the leading direction AF is applied to the engine oil 41 in the oil clearance 60 in accordance with rotation of the crankshaft 5. Thus, in the oil clearance 60, most of the engine oil 41 flows from the trailing direction AR toward the leading direction AF. The engine oil 41 flows among the oil passages 61 to 65 of the oil clearance 60 as follows.

The engine oil 41 in the in-groove oil passage 62 flows into the groove facing oil passage 63, the first relief oil passage 65A, or the first chamfer oil passage 66A. The engine oil 41 in the groove facing oil passage 63 flows into the first bearing oil passage 61A, the first end oil passage 64A, or the inlet oil passage 55J. The engine oil 41 in the first bearing oil passage 61A flows into the first end oil passage 64A. Alternatively, the engine oil 41 in the first bearing oil passage 61A flows out of the oil clearance 60 via the side surfaces 76 of the upper bearing 7. The engine oil 41 in the first end oil passage 64A flows into the first relief oil passage 65A or the second bearing oil passage 61B. Alternatively, the engine oil 41 in the first end oil passage 64A flows out of the oil clearance 60 via either the side surfaces 76 of the upper bearing 7 or the side surfaces 86 of the lower bearing 8. The engine oil 41 in the first relief oil passage 65A flows into the first chamfer oil passage 66A or the first end oil passage 64A. Alternatively, the engine oil 41 in the first relief oil passage 65A flows out of the oil clearance 60 via either the side surfaces 76 of the upper bearing 7 or the side surfaces 86 of the lower bearing 8. The engine oil 41 in the first chamfer oil passage 66A flows out of the oil clearance 60 via either the side surfaces 76 of the upper bearing 7 or the side surfaces 86 of the lower bearing 8. Alternatively, the engine oil 41 of the first chamfer oil passage 66A flows into the first relief oil passage 65A. The engine oil 41 in the second bearing oil passage 61B flows into the second end oil passage 64B. Alternatively, the engine oil 41 in the second bearing oil passage 61B flows out of the oil clearance 60 via the side surfaces 86 of the lower bearing 8. The engine oil 41 of the second end oil passage 64B flows into the second relief oil passage 65B or the first bearing oil passage 61A. Alternatively, the engine oil 41 of the second end oil passage 64B flows out of the oil clearance 60 via either the side surfaces 86 of the lower bearing 8 or the side surfaces 76 of the upper bearing 7. The engine oil 41 in the second relief oil passage 65B flows into the second chamfer oil passage 66B or the second end oil passage 64B. Alternatively, the engine oil 41 in the second relief oil passage 65B flows out of the oil clearance 60 via either the side surfaces 86 of the lower bearing 8 or the side surfaces 76 of the upper bearing 7. The engine oil 41 in the second chamfer oil passage 66B flows out of the oil clearance 60 via either the side surfaces 86 of the lower bearing 8 or the side surfaces 76 of the upper bearing 7. Alternatively, the engine oil 41 of the second chamfer oil passage 66B flows into the second relief oil passage 65B.

In the crank bearing 6, the relationship between the passage area SA of the first relief oil passage 65A and the passage area TA of the first chamfer oil passage 66A, and the relationship between the passage area SB of the second relief oil passage 65B and the passage area TB of the second chamfer oil passage 66B are set as shown in the following (A) and (B).

More specifically, the passage area SA, the passage area TA, the passage area SB, and the passage area TB represent passage areas specified as follows. That is, the passage area SA of the first relief oil passage 65A corresponds to the sum of the cross-sectional area of the first leading side relief body 111 along the radial direction of the crank bearing 6 and the cross-sectional area of the second trailing side relief body 122 along the radial direction of the crank bearing 6. The passage area TA of the first chamfer oil passage 66A corresponds to the sum of the cross-sectional area of the first leading side chamfer body 211 along the radial direction of the crank bearing 6 and the cross-sectional area of the second trailing side chamfer body 222 along the radial direction of the crank bearing 6. The passage area SB of the second relief oil passage 65B corresponds to the sum of the cross-sectional area of the first trailing side relief body 112 along the radial direction of the crank bearing 6 and the cross-sectional area of the second leading side relief body 121 along the radial direction of the crank bearing 6. The passage area TB of the second chamfer oil passage 66B corresponds to the sum of the cross-sectional area of the first trailing side chamfer body 212 along the radial direction of the crank bearing 6 and the cross-sectional area of the second leading side chamfer body 221 along the radial direction of the crank bearing 6.

(A) As for the first relief oil passage 65A and the first chamfer oil passage 66A, the relationship between the passage area SA of the first relief oil passage 65A and the passage area TA of the first chamfer oil passage 66A is set such that the flow rate of the engine oil 41 (first chamfer flow rate QB) that flows out of the oil clearance 60 via the first chamfer oil passage 66A is greater than the flow rate of the engine oil 41 (first relief flow rate QA) that flows out of the oil clearance 60 via the first relief oil passage 65A. The relationship between the passage area SA and the passage area TA is determined by setting the relationship between the size (forming range and depth) of the leading side crush relief 73F and the size of the leading side chamfer 74F, and the relationship between the size (forming range and depth) of the trailing side crush relief 83R and the size of the trailing side chamfer 84R such that the first chamfer flow rate QB is greater than the first relief flow rate QA.

(B) As for the second relief oil passage 65B and the second chamfer oil passage 66B, the relationship between the passage area SB of the second relief oil passage 65B and the passage area TB of the second chamfer oil passage 66B is set such that the flow rate of the engine oil 41 (second chamfer flow rate QD) that flows out of the oil clearance 60 via the second chamfer oil passage 66B is greater than the flow rate of the engine oil 41 (second relief flow rate QC) that flows out of the oil clearance 60 via the second relief oil passage 65B. The relationship between the passage area SB and the passage area TB is determined by setting the relationship between the size (forming range and depth) of the trailing side crush relief 73R and the size of the trailing side chamfer 74R, and the relationship between the size (forming range and depth) of the leading side crush relief 83F and the size of the leading side chamfer 84F such that the second chamfer flow rate QD is greater than the second relief flow rate QC.

The present embodiment has the following advantages.

(1) Each crank bearing 6 is provided with the non-undercut portion 7ER located on the side in the trailing direction AR of the inner circumference opening 77A of the oil hole 77. The oil groove 78 is formed to connect the inner circumference opening 77A of the oil hole 77 to the leading side matching surface 72F via the leading side crush relief 73F and the leading side chamfer 74F. Thus, since the amount of the engine oil 41 that is supplied to the oil clearance 60 on the side in the trailing direction AR of the inner circumference opening 77A of the oil hole 77 via the oil groove 78 is reduced, the amount of the engine oil 41 that flows out of the oil clearance 60 is reduced as compared to the case where the non-undercut portion 7ER is not provided. Also, since the amount of the engine oil 41 supplied to the second relief oil passage 65B and the second chamfer oil passage 66B is reduced, the amount of the engine oil 41 that flows out of the oil clearance 60 is reduced. Since foreign matter that has flowed into the oil clearance 60 via the oil hole 77 flows out of the oil clearance 60 in the axial direction of the crank bearing 6 by flowing through the oil groove 78 and the first relief oil passage 65A, damage caused by foreign matter is inhibited. Since the non-undercut portion 7ER is provided on the side in the trailing direction AR of the inner circumference opening 77A of the oil hole 77, rotation of the crankshaft 5 prevents foreign matter in the oil groove 78 from flowing into the oil clearance 60 corresponding to the non-undercut portion 7ER. Thus, damage caused by foreign matter is inhibited in a suitable manner. As described above, according to the crank bearing 6 of the first embodiment, the amount of the engine oil 41 that flows out of the oil clearance 60 is reduced while inhibiting damage caused by foreign matter.

(2) According to the crank bearing 6 of the first embodiment, the width of the oil groove 78 is set smaller than the diameter of the oil hole 77 (the diameter of the inner circumference opening 77A). Thus, since the passage resistance of the oil groove 78 is increased as compared to a case where the width of the oil groove 78 is set greater than the diameter of the oil hole 77, the amount of the engine oil 41 that flows out of the oil clearance 60 is reduced. According to the crank bearing 6 of the first embodiment, since the width of the oil groove 78 is set to the minimum within the range that does not significantly reduce the processability in forming the oil groove 78, the leakage rate of the engine oil 41 from the oil clearance 60 is further reduced without reducing the productivity of the crank bearing 6.

(3) According to the crank bearing 6 of the first embodiment, the inner circumference opening 77A of the oil hole 77 is provided on the side in the trailing direction AR of the circumferential center CA of the upper bearing 7. Thus, as compared to the case where the inner circumference opening 77A of the oil hole 77 is provided on the side in the leading direction AF of the circumferential center CA, the distance from the inner circumference opening 77A to the leading end portion 78F of the oil groove 78 is increased. The passage resistance of the oil groove 78 is thus increased. Thus, the amount of the engine oil 41 that flows out of the oil clearance 60 is reduced.

(4) According to the crank bearing 6 of the first embodiment, the upper bearing 7 is provided with only one oil hole 77, which supplies the engine oil 41 outside of the crank bearing 6 to the oil clearance 60. Thus, as compared to the case where several oil holes are provided to supply the engine oil 41 to the oil clearance 60, the amount of the engine oil 41 supplied to the oil clearance 60 from the outside of the crank bearing 6 is reduced. The amount of the engine oil 41 that flows out of the oil clearance 60 is thus reduced.

(5) According to the crank bearing 6 of the first embodiment, the depth of the oil groove 78 at a section on the side in the leading direction AF of the inner circumference opening 77A of the oil hole 77 is set to the minimum in the leading end portion 78F. Thus, for example, as compared to the case where the depth of the oil groove 78 at the section on the side in the leading direction AF of the inner circumference opening 77A of the oil hole 77 is set to be uniform, the amount of the engine oil 41 that flows to the outside of the oil groove 78 from the inside of the oil groove 78 is reduced. This reduces the amount of the engine oil 41 that flows out of the oil clearance 60.

(6) The present inventor has found through experiments that, in the engine 1 to which the crank bearing 6 is applied, the amount of foreign matter discharged outside from the oil clearance 60 is increased as the first chamfer flow rate QB is increased with respect to the first relief flow rate QA. Based on such facts, the relationship between the passage area TA of the first chamfer oil passage 66A and the passage area SA of the first relief oil passage 65A is set such that the first chamfer flow rate QB is greater than the first relief flow rate QA in the crank bearing 6 of the first embodiment. Thus, since most of the foreign matter that has flowed into the oil clearance 60 with the engine oil 41 is discharged outside of the oil clearance 60 via the first chamfer oil passage 66A, damage caused by foreign matter is inhibited in a more suitable manner.

(7) The present inventor has found through experiments that, in the engine 1 to which the crank bearing 6 is applied, the amount of foreign matter that is discharged outside from the oil clearance 60 is increased as the second chamfer flow rate QD is increased with respect to the second relief flow rate QC. Based on such fact, the relationship between the passage area TB of the second chamfer oil passage 66B and the passage area SB of the second relief oil passage 65B is set such that the second chamfer flow rate QD is greater than the second relief flow rate QC in the crank bearing 6 of the first embodiment. Thus, since most of the foreign matter that has flowed into the oil clearance 60 with the engine oil 41 is discharged outside of the oil clearance 60 via the second chamfer oil passage 66B, damage caused by foreign matter is inhibited in a more suitable manner.

(8) In the first chamfer oil passage 66A, since the distance between the crank bearing 6 and the crank journal 51 is great as compared to the first relief oil passage 65A and the second bearing oil passage 61B, the possibility for foreign matter in the first chamfer oil passage 66A to damage the crank bearing 6 is considered to be very low. Thus, in the crank bearing 6 of the first embodiment, the passage area TA is set to the maximum in the range in which the amount of the engine oil 41 that flows to the outside of the oil clearance 60 via the first chamfer oil passage 66A does not exceed the upper limit amount, that is, the amount that is permitted as the amount of the engine oil 41 that flows out of the oil clearance 60. Accordingly, most of the foreign matter in the oil clearance 60 is discharged to the outside of the oil clearance 60 via the first chamfer oil passage 66A. Damage caused by foreign matter is therefore inhibited in a more suitable manner.

(9) In the second chamfer oil passage 66B, since the distance between the crank bearing 6 and the crank journal 51 is great as compared to the second relief oil passage 65B and the first bearing oil passage 61A, the possibility for the foreign matter in the second chamfer oil passage 66B to damage the crank bearing 6 is considered to be very low. Thus, in the crank bearing 6 of the first embodiment, the passage area TB is set to the maximum in the range in which the amount of the engine oil 41 that flows to the outside of the oil clearance 60 via the second chamfer oil passage 66B does not exceed the upper limit amount, that is, the amount permitted as the amount of the engine oil 41 that flows out of the oil clearance 60. Accordingly, most of the foreign matter in the oil clearance 60 is discharged to the outside of the oil clearance 60 via the second chamfer oil passage 66B. Damage caused by foreign matter is therefore inhibited in a more suitable manner.

(10) According to the crank bearing 6 of the first embodiment, the chamfer oil passage 66 is formed as an auxiliary oil passage that discharges foreign matter in the oil groove 78 to the outside of the oil clearance 60 using the chamfers 74, 84. Accordingly, the loading capability of the crank bearing 6 is inhibited from being reduced as compared to the case where the auxiliary oil passage is formed separately from the chamfers 74, 84.

(11) According to the crank bearing 6 of the first embodiment, the relief oil passage 65 is formed as an auxiliary oil passage that discharges foreign matter in the oil groove 78 to the outside of the oil clearance 60 using the crush reliefs 73, 83. Accordingly, the loading capability of the crank bearing 6 is inhibited from being reduced as compared to the case where the auxiliary oil passage is formed separately from the crush reliefs 73, 83.

(12) The advantages of the crank bearing 6 according to the present embodiment will be described based on the comparison with a crank bearing 6X according to a comparative example shown in FIGS. 29 and 30. FIG. 29 shows the structure of an upper bearing 7X of the crank bearing 6X as viewed from the front. FIG. 30 shows the structure of the upper bearing 7X as viewed from the bottom.

As shown in FIGS. 29 and 30, the crank bearing 6X differs from the crank bearing 6 of the first embodiment in the following points. That is, the upper bearing 7X of the crank bearing 6X is provided with an oil groove 7XA instead of the oil groove 78. The oil groove 7XA extends to connect the leading side matching surface 72F to the trailing side matching surface 72R via the inner circumference opening 77A of the oil hole 77. Also, the upper bearing 7X is not provided with the non-undercut portion 7ER. The crank bearing 6X employs substantially the same structure as the crank bearing 6 of the first embodiment except for the above-mentioned modifications. Also, in the drawings, the components that are the same as those of the first embodiment are given the same reference numerals as the first embodiment.

In the engine 1 to which the crank bearing 6X is applied, the engine oil 41 in the oil groove 7XA flows into the groove facing oil passage 63, the first relief oil passage 65A, the first chamfer oil passage 66A, the second relief oil passage 65B, or the second chamfer oil passage 66B. Since a force that acts from the trailing direction AR to the leading direction AF is applied to the engine oil 41 in the oil clearance 60 in accordance with rotation of the crankshaft 5, part of the engine oil 41 in the second relief oil passage 65B flows from the second relief oil passage 65B into the first bearing oil passage 61A before flowing to the outside of the oil clearance 60 via the side surfaces 76 of the upper bearing 7X and the side surfaces 86 of the lower bearing 8. At this time, there is high possibility of causing damage on the upper bearing 7X or seizure of the crankshaft 5 since foreign matter in the engine oil 41 also flows from the second relief oil passage 65B, at which the distance between the crank bearing 6 and the crank journal 51 is great, to the first bearing oil passage 61A, at which the distance is small.

In contrast, since the crank bearing 6 of the first embodiment is provided with the non-undercut portion 7ER, the non-undercut portion 7ER prevents the engine oil 41 from flowing from the oil groove 78 into the second relief oil passage 65B. Thus, the amount of foreign matter that flows into the second relief oil passage 65B is reduced as compared to the case where the crank bearing 6X is applied to the engine 1. Accordingly, the amount of foreign matter that flows from the second relief oil passage 65B into the first bearing oil passage 61A in accordance with rotation of the crankshaft 5 is reduced. Also, damage on the upper bearing 7 and seizure of the crankshaft 5 are inhibited in a suitable manner.

(13) In the engine 1 of the first embodiment, the amount of the engine oil 41 that flows out of the oil clearance 60 is reduced since the crank bearing 6 supports the crankshaft 5. Thus, the lubricity of the crankshaft 5 is improved, and the fuel consumption rate is improved by reducing the amount of work of the oil pump 42.

(14) Since the amount of foreign matter that flows into the oil clearance 29 of the connecting rod bearing 28 is reduced, damage on the connecting rod bearing 28 and seizure of the connecting rod 27 are inhibited.

The first embodiment may be modified as follows.

The depth of the region of the oil groove 78 on the side in the leading direction AF of the inner circumference opening 77A of the oil hole 77 is not limited to the example of the first embodiment. That is, the depth of the region of the oil groove 78 on the side in the leading direction AF of the inner circumference opening 77A of the oil hole 77 may be set to any value as long as there is at least one section where the relative passage area becomes the minimum.

The configurations of the crush reliefs 73, 83 and the chamfers 74, 84 may be modified to any of the configurations in the following items (A) to (D). Also, the configuration of the following items (A) to (D) may be combined as required.

(A) In the upper bearing 7, the leading side crush relief 73F and the leading side chamfer 74F may be omitted. In this case, the zone LA of the oil clearance 60 forms the first relief oil passage 65A. Also, the zone LC of the oil clearance 60 forms the first chamfer oil passage 66A. The first chamfer flow rate QB can be made greater than the first relief flow rate QA by adjusting the relationship between the size (forming range and depth) of the trailing side crush relief 83R of the lower bearing 8 and the size of the trailing side chamfer 84R of the lower bearing 8.

(B) In the upper bearing 7, the trailing side crush relief 73R and the trailing side chamfer 74R may be omitted. In this case, the zone LB of the oil clearance 60 forms the second relief oil passage 65B. Also, the zone LD of the oil clearance 60 forms the second chamfer oil passage 66B. The second chamfer flow rate QD can be made greater than the second relief flow rate QC by adjusting the relationship between the size (forming range and depth) of the leading side crush relief 83F of the lower bearing 8 and the size of the leading side chamfer 84F of the lower bearing 8.

(C) In the lower bearing 8, the trailing side crush relief 83R and the trailing side chamfer 84R may be omitted. In this case, the zone UA of the oil clearance 60 forms the first relief oil passage 65A. Also, the zone UC of the oil clearance 60 forms the first chamfer oil passage 66A. The first chamfer flow rate QB can be made greater than the first relief flow rate QA by adjusting the relationship between the size (forming range and depth) of the leading side crush relief 73F of the upper bearing 7 and the size of the leading side chamfer 74F of the upper bearing 7.

(D) In the lower bearing 8, the leading side crush relief 83F and the leading side chamfer 84F may be omitted. In this case, the zone UB of the oil clearance 60 forms the second relief oil passage 65B. Also, the zone UD of the oil clearance 60 forms the second chamfer oil passage 66B. The second chamfer flow rate QD can be made greater than the second relief flow rate QC by adjusting the relationship between the size (forming range and depth) of the trailing side crush relief 73R of the upper bearing 7 and the size of the trailing side chamfer 74R of the upper bearing 7.

Next, a second embodiment of the present invention will be described with reference to FIG. 31.

The crank bearing 6 of the present embodiment is configured by modifying part of the crank bearing 6 of the first embodiment as follows. In FIG. 31, the components that are the same as those of the first embodiment are given the same reference numerals as the first embodiment.

Figure 31:
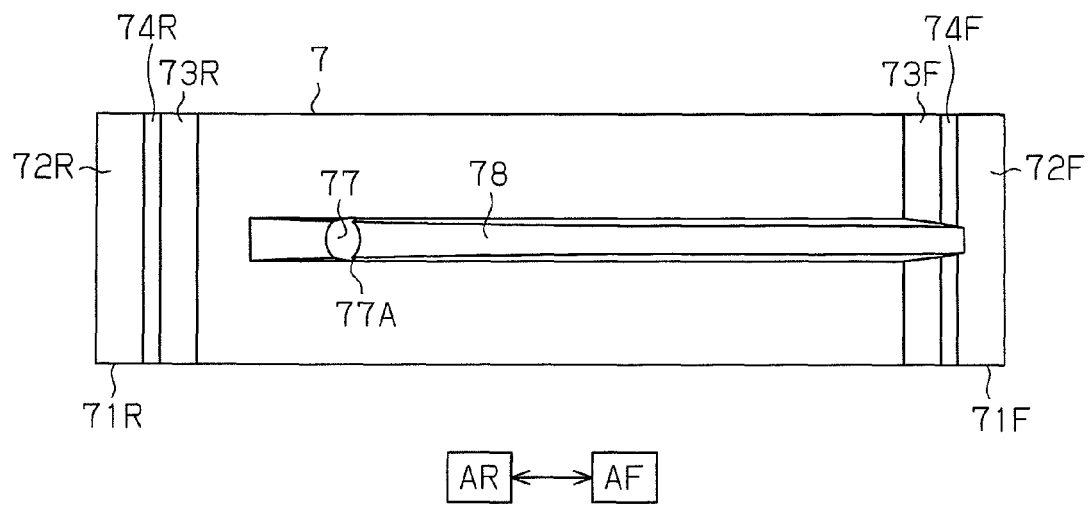
FIG. 31 is a bottom view illustrating the inner circumferential surface of an upper bearing according to a second embodiment of the present invention.

As shown in FIG. 31, in the crank bearing 6 of the second embodiment, the width of the oil groove 78 is set equal to the diameter of the oil hole 77 (the diameter of the inner circumference opening 77A). Also, the depth of the oil groove 78 is set to be the greatest at the circumferential center CB of the oil groove 78. Moreover, the depth of the oil groove 78 is set to be gradually reduced from the circumferential center CB toward the trailing end portion 78R, and is zero at the trailing end portion 78R. Furthermore, the depth of the oil groove 78 is set to be gradually reduced from the circumferential center CB toward the leading end portion 78F.

As described above, according to the crank bearing 6 of the second embodiment, the following advantage (15) is provided in addition to the advantages (1) and (3) to (14) of the first embodiment.

(15) Since the oil groove 78 is easily formed as compared to a case where the width of the oil groove 78 is set to be smaller than the diameter of the oil hole 77, the productivity of the crank bearing 6 is improved.

Next, a third embodiment of the present invention will be described with reference to FIG. 32.

The crank bearing 6 of the present embodiment is configured by modifying part of the crank bearing 6 of the first embodiment as follows. In FIG. 32, the components that are the same as those of the first embodiment are given the same reference numerals as the first embodiment.

Figure 32:
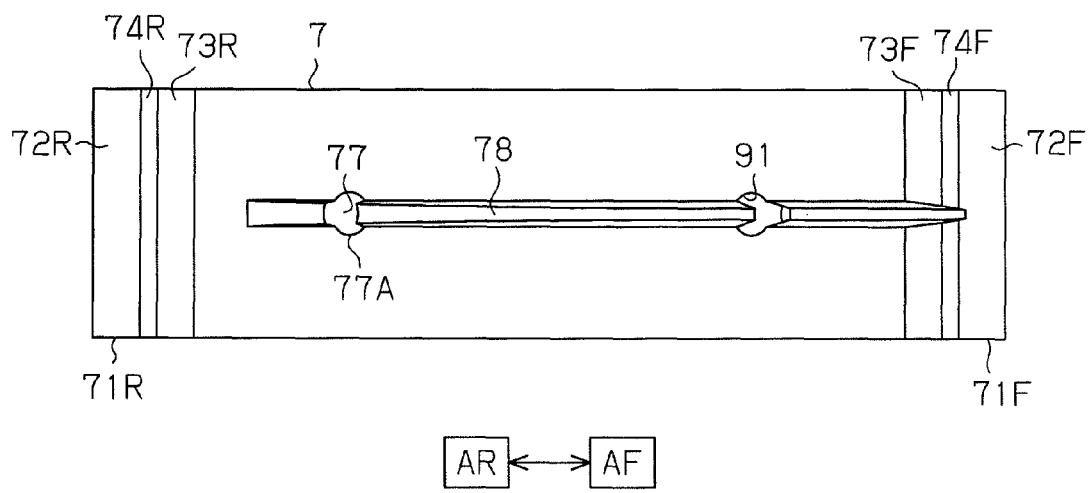
FIG. 32 is a bottom view illustrating the inner circumferential surface of an upper bearing according to a third embodiment of the present invention.

As shown in FIG. 32, in the crank bearing 6 of the present embodiment, an oil hole 91 is provided at part of the middle bearing section 7E on the side in the leading direction AF of the oil hole 77. The oil hole 91 permits the engine oil 41 in the bearing oil groove 32R of the partition wall 32 to flow to the oil clearance 60 independently from the oil hole 77. The oil hole 91 is provided on the side in the leading direction AF of the circumferential center CA of the upper bearing 7. The diameter of the oil hole 91 is set equal to the diameter of the oil hole 77.

As described above, according to the crank bearing 6 of the third embodiment, the following advantage (16) is provided in addition to the advantages (1) to (3) and (5) to (14) of the first embodiment.

(16) Since the amount of the engine oil 41 supplied to the oil clearance 60 is increased as compared to the case where the oil hole 91 is not provided, the amount of the engine oil 41 in the oil clearance 60 is inhibited from being insufficient in a suitable manner.

Next, a fourth embodiment of the present invention will be described with reference to FIG. 33.

The crank bearing 6 of the present embodiment is configured by modifying part of the crank bearing 6 of the first embodiment as follows. In FIG. 33, the components that are the same as those of the first embodiment are given the same reference numerals as the first embodiment.

Figure 33:
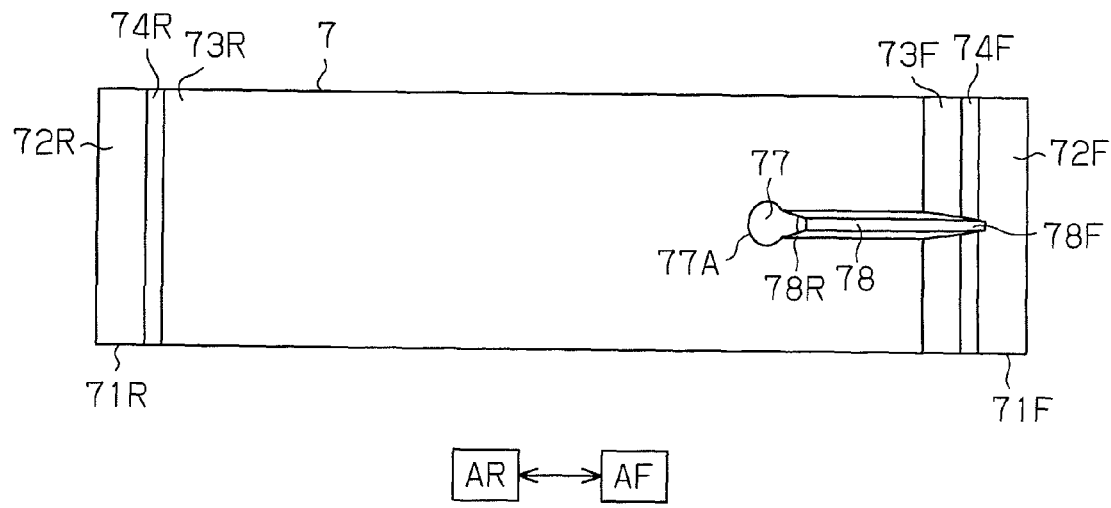
FIG. 33 is a bottom view illustrating the inner circumferential surface of an upper bearing according to a fourth embodiment of the present invention.

As shown in FIG. 33, in the crank bearing 6 of the fourth embodiment, the oil hole 77 is located on the side in the leading direction AF of the circumferential center CA. The oil groove 78 is located within the range that is on the side in the leading direction AF of the circumferential center CA of the upper bearing 7. The trailing end portion 78R of the oil groove 78 is provided at the inner circumference opening 77A of the oil hole 77. The depth of the oil groove 78 at the trailing end portion 78R is set greater than zero such that the engine oil 41 in the oil hole 77 flows into the oil groove 78 via the trailing end portion 78R. The region between the trailing end portion 78R of the oil groove 78 and the trailing side crush relief 73R corresponds to the non-undercut portion 7ER.

As described above, according to the crank bearing 6 of the third embodiment, the following advantages (17) and (18) are provided in addition to the advantages (1), (2), and (4) to (14) of the first embodiment.

(17) The bearing area of the upper bearing 7 is increased as compared to the case where the oil hole 77 is located on the side in the trailing direction AR of the circumferential center CA, that is, as compared to the case where the oil groove 78 extends from a section that is on the side in the trailing direction AR of the circumferential center CA to the leading side matching surface 72F. Thus, the loading capability of the crank bearing 6 is improved.

(18) Since the amount of the engine oil 41 that flows from the oil groove 78 into the first bearing oil passage 61A is reduced, the amount of foreign matter that flows into the first bearing oil passage 61A is reduced accordingly. Thus, damage caused by foreign matter and seizure of the crankshaft 5 are inhibited in a more suitable manner.

Next, a fifth embodiment of the present invention will be described with reference to FIG. 34.

The crank bearing 6 of the present embodiment is configured by modifying part of the crank bearing 6 of the fourth embodiment as follows. In FIG. 34, the components that are the same as those of the first embodiment are given the same reference numerals as the first embodiment.

Figure 34:
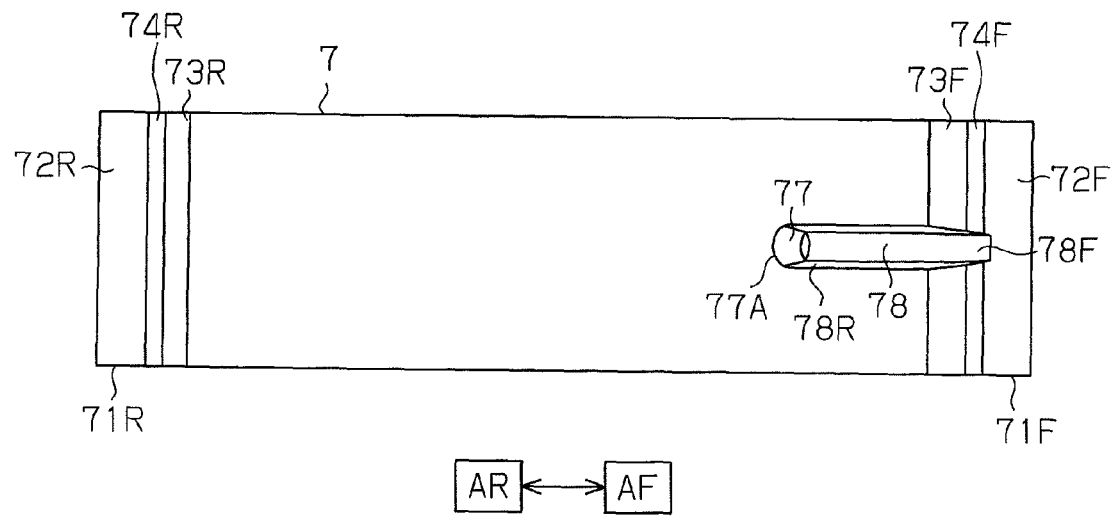
FIG. 34 is a bottom view illustrating the inner circumferential surface of an upper bearing according to a fifth embodiment of the present invention.

In the crank bearing 6 of the fifth embodiment, the width of the oil groove 78 is set equal to the diameter of the oil hole 77 (the diameter of the inner circumference opening 77A) as shown in FIG. 34. The depth of the oil groove 78 is set to be the greatest at the circumferential center CB of the oil groove 78. The depth of the oil groove 78 is set to be gradually reduced from the circumferential center CB toward the trailing end portion 78R, and becomes zero at the trailing end portion 78R. The depth of the oil groove 78 is set to be gradually reduced from the circumferential center CB toward the leading end portion 78F.

As described above, according to the crank bearing 6 of the fifth embodiment, the advantage (15) of the second embodiment is provided in addition to the advantages (1), (2), and (4) to (14) of the first embodiment and the advantages (17) and (18) of the fourth embodiment.

Next, a sixth embodiment of the present invention will be described with reference to FIG. 35.

The crank bearing 6 of the present embodiment is configured by modifying part of the crank bearing 6 of the fourth embodiment as follows. In FIG. 35, the components that are the same as those of the first embodiment are given the same reference numerals as the first embodiment.

As shown in FIG. 35, the depth of the oil groove 78 is set as follows in the crank bearing 6 of the present embodiment. That is, the depth of the oil groove 78 is set to be the greatest at the leading end portion 78F. The depth of the oil groove 78 is set to be the smallest at the trailing end portion 78R. The depth of the oil groove 78 at the trailing end portion 78R is set greater than zero so that the engine oil 41 in the oil hole 77 flows into the oil groove 78 via the trailing end portion 78R. Also, the depth of the oil groove 78 is set to be gradually reduced from the leading end portion 78F toward the trailing end portion 78R.

As described above, according to the crank bearing 6 of the sixth embodiment, the following advantage (19) is provided in addition to the advantages (1), (2), and (4) to (14) of the first embodiment, and the advantages (17) and (18) of the fourth embodiment.

(19) As compared to the case where the depth of the oil groove 78 is set to be the greatest at the circumferential center CB and reduced toward the end portions, process constraints when forming the oil groove 78 are reduced. Thus, the productivity of the crank bearing 6 is improved.

Next, a seventh embodiment of the present invention will be described with reference to FIG. 36.

The crank bearing 6 of the present embodiment is configured by modifying the shape of the oil groove 78 of the crank bearing 6 according to the first embodiment as follows. In FIG. 36, the components that are the same as those of the first embodiment are given the same reference numerals as the first embodiment.

In the crank bearing 6 of the present embodiment, the first relief section 7C of the upper bearing 7 is provided with an oil groove 92, which connects one of the side surfaces 76 to the other side surface 76 as shown in FIG. 36. The oil groove 92 discharges the engine oil 41 in the oil groove 78 and the first relief oil passage 65A to the outside of the oil clearance 60 from the side surfaces 76.

As described above, according to the crank bearing 6 of the seventh embodiment, the following advantage (20) is provided in addition to the advantages (1) to (14) of the first embodiment.

(20) Since the engine oil 41 in the oil groove 78 and the first relief oil passage 65A is discharged to the outside of the oil clearance 60 via the oil groove 92, foreign matter in the oil clearance 60 is more reliably discharged. Thus, damage caused by foreign matter is inhibited in a more suitable manner.

Next, an eighth embodiment of the present invention will be described with reference to FIG. 37.

The crank bearing 6 of the eighth embodiment is configured by modifying part of the crank bearing 6 of the first embodiment as follows. In FIG. 37, the components that are the same as those of the first embodiment are given the same reference numerals as the first embodiment.

As shown in FIG. 37, the oil groove 78 is formed as follows in the crank bearing 6 of the eighth embodiment. That is, the oil groove 78 is formed to extend from the region between the inner circumference opening 77A of the oil hole 77 and the non-undercut portion 7ER to the region within the first relief section 7C. That is, the oil groove 78 is formed to connect the inner circumference opening 77A to the leading side crush relief 73F. Also, the circumferential center CB of the oil groove 78 is formed to be located on the side in the leading direction AF of the circumferential center CA of the upper bearing 7. The width of the oil groove 78 is set smaller than the diameter of the oil hole 77 (the diameter of the inner circumference opening 77A). The depth of the oil groove 78 is set to be the greatest at the circumferential center CB. Also, the depth of the oil groove 78 is set to be gradually reduced from the circumferential center CB toward the trailing end portion 78R and become zero at the trailing end portion 78R. Also, the depth of the oil groove 78 is set to be gradually reduced from the circumferential center CB toward the leading end portion 78F.

As described above, according to the crank bearing 6 of the eighth embodiment, the advantages that are the same as the advantages (1) to (14) of the first embodiment are provided.

Next, a ninth embodiment of the present invention will be described with reference to FIG. 38.

The crank bearing 6 of the present embodiment is configured by modifying part of the crank bearing 6 of the first embodiment as follows. In FIG. 38, the components that are the same as those of the first embodiment are given the same reference numerals as the first embodiment.

As shown in FIG. 38, the oil groove 78 is formed as follows in the crank bearing 6 of the ninth embodiment. That is, the oil groove 78 is formed to extend from the region between the inner circumference opening 77A of the oil hole 77 and the non-undercut portion 7ER to the region within the first chamfered section 7A. Also, the oil groove 78 is formed to communicate with the inner circumference opening 77A, the leading side crush relief 73F, and the leading side chamfer 74F. Also, the oil groove 78 is formed such that the circumferential center CB of the oil groove 78 is located on the side in the leading direction AF of the circumferential center CA of the upper bearing 7. The width of the oil groove 78 is set smaller than the diameter of the oil hole 77 (the diameter of the inner circumference opening 77A). The depth of the oil groove 78 is set to be the greatest at the circumferential center CB. Also, the depth of the oil groove 78 is set to be gradually reduced from the circumferential center CB toward the trailing end portion 78R and become zero at the trailing end portion 78R. The depth of the oil groove 78 is set to be gradually reduced from the circumferential center CB toward the leading end portion 78F.

As described above, according to the crank bearing 6 of the ninth embodiment, the advantages that are the same as the advantages (1) to (14) of the first embodiment are provided.

Next, a tenth embodiment of the present invention will be described with reference to FIG. 39.

The crank bearing 6 of the tenth embodiment is configured by modifying part of the crank bearing 6 of the first embodiment as follows. In FIG. 39, the components that are the same as those of the first embodiment are given the same reference numerals as the first embodiment.

Figure 39:
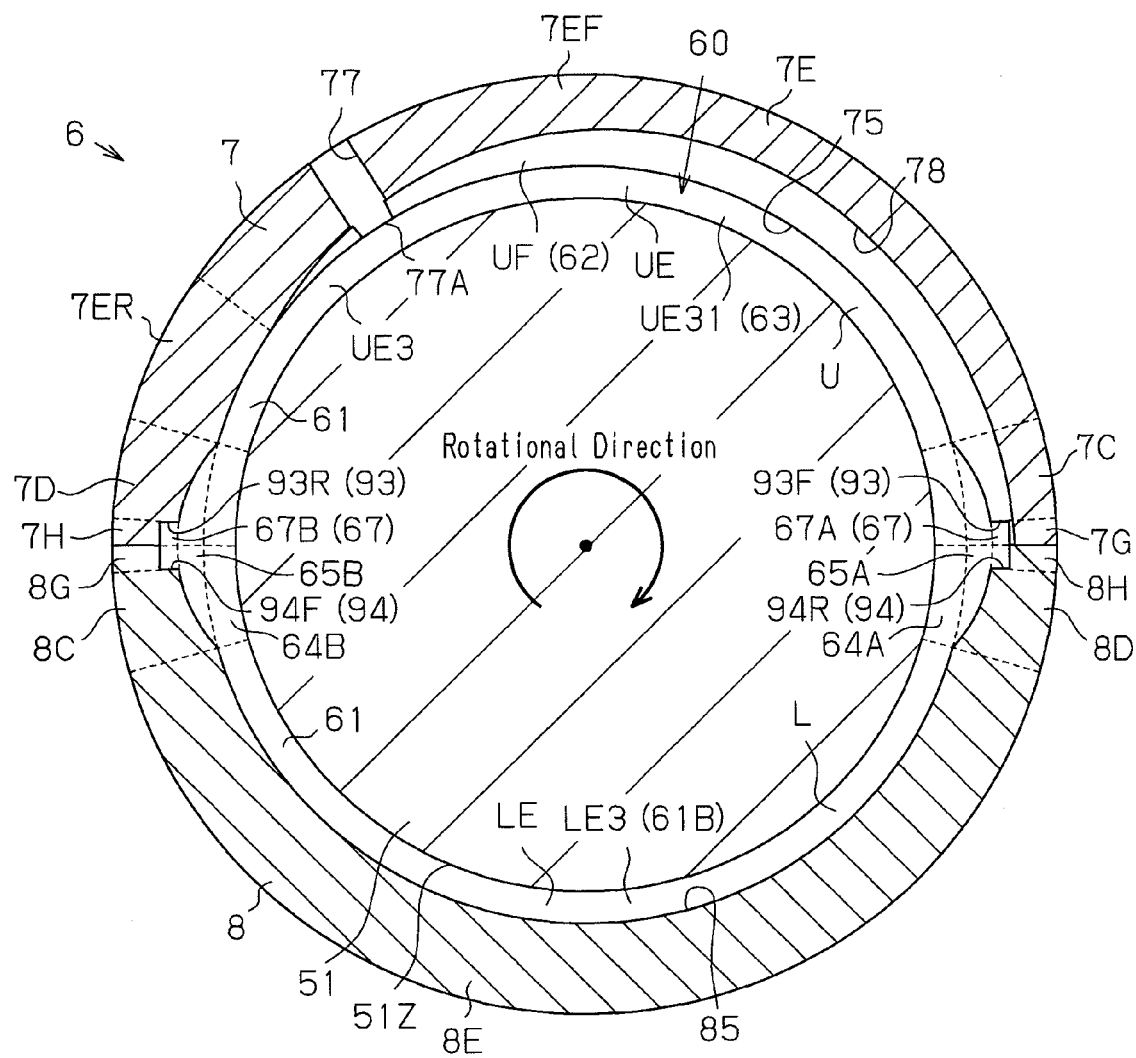
FIG. 39 is a cross-sectional view illustrating an upper bearing according to a tenth embodiment of the present invention.

As shown in FIG. 39, in the crank bearing 6 of the present embodiment, oil grooves 93 are provided instead of the chamfers 74 of the upper bearing 7 according to the first embodiment. The oil grooves 93 include a leading side oil groove 93F and a trailing side oil groove 93R. Also, oil grooves 94 are provided instead of the chamfers 84 of the lower bearing 8 according to the first embodiment. The oil grooves 94 include a leading side oil groove 94F and a trailing side oil groove 94R. According to the modification, the oil clearance 60 of the tenth embodiment is provided with groove oil passages 67 corresponding to the chamfer oil passages 66 of the first embodiment.

As for the oil grooves 93 of the upper bearing 7, the leading side oil groove 93F is formed to connect one of the side surfaces 76 to the other side surface 76. The leading side oil groove 93F is an oil passage for discharging the engine oil 41 in the oil groove 78 and the first relief oil passage 65A to the outside of the oil clearance 60 from the side surfaces 76. The trailing side oil groove 93R is formed to connect one of the side surfaces 76 to the other side surface 76. The trailing side oil groove 93R is an oil passage for discharging the engine oil 41 in the second relief oil passage 65B to the outside of the oil clearance 60 from the side surfaces 76.

The upper bearing 7 is divided in the circumferential direction as follows. That is, the upper bearing 7 is divided into a first groove section 7G in which the leading side oil groove 93F is provided, a second groove section 7H in which the trailing side oil groove 93R is provided, a first relief section 7C in which the leading side crush relief 73F is provided, a second relief section 7D in which the trailing side crush relief 73R is provided, and a middle bearing section 7E in which the inner circumference opening 77A of the oil hole 77 is provided.

As for the oil grooves 94 of the lower bearing 8, the leading side oil groove 94F is formed to connect one of the side surfaces 86 to the other side surface 86. The leading side oil groove 94F is an oil passage for discharging the engine oil 41 in the second relief oil passage 65B to the outside of the oil clearance 60 from the side surfaces 86. The trailing side oil groove 94R is formed to connect one of the side surfaces 86 to the other side surface 86. The trailing side oil groove 94R is an oil passage for discharging the engine oil 41 in the first relief oil passage 65A to the outside of the oil clearance 60 from the side surfaces 86.

The lower bearing 8 is divided in the circumferential direction as follows. That is, the lower bearing 8 is divided into a first groove section 8G in which the leading side oil groove 94F is provided, a second groove section 8H in which the trailing side oil groove 94R is provided, a first relief section 8C in which the leading side crush relief 83F is provided, a second relief section 8D in which the trailing side crush relief 83R is provided, and a middle bearing section 8E provided between the first relief section 8C and the second relief section 8D.

The groove oil passages 67 include a first groove oil passage 67A and a second groove oil passage 67B. The first groove oil passage 67A is located between the inner circumferential surface of the first groove section 7G of the upper bearing 7 and the inner circumferential surface of the second groove section 8H of the lower bearing 8, and the imaginary inner circumferential surface 201 and the imaginary inner circumferential surface 204 of the second imaginary bearing 200. The second groove oil passage 67B is located between the inner circumferential surfaces of the second groove section 7H of the upper bearing 7 and the first groove section 8G of the lower bearing 8, and the imaginary inner circumferential surfaces 202, 203 of the second imaginary bearing 200. The groove oil passages 67 correspond to the auxiliary oil passages provided at the matching portions of the crank bearing 6.

In the crank bearing 6, the relationship between the passage area SA of the first relief oil passage 65A and the passage area TC of the first groove oil passage 67A, and the relationship between the passage area SB of the second relief oil passage 65B and the passage area TD of the second groove oil passage 67B are set as shown in the following items (A) and (B).

(A) As for the first relief oil passage 65A and the first groove oil passage 67A, the relationship between the passage area SA of the first relief oil passage 65A and the passage area TC of the first groove oil passage 67A is set such that the flow rate (first groove flow rate QE) of the engine oil 41 that flows to the outside of the oil clearance 60 via the first groove oil passage 67A is greater than the flow rate (first relief flow rate QA) of the engine oil 41 that flows to the outside of the oil clearance 60 via the first relief oil passage 65A. The relationship between the passage area SA and the passage area TC is determined by setting the relationship between the size of the leading side crush relief 73F and the size of the leading side oil groove 93F, and the relationship between the size of the trailing side crush relief 83R and the size of the trailing side oil groove 94R such that the first groove flow rate QE is greater than the first relief flow rate QA.

(B) As for the second relief oil passage 65B and the second groove oil passage 67B, the relationship between passage area SB of the second relief oil passage 65B and the passage area TD of the second groove oil passage 67B is set such that the flow rate (second groove flow rate QF) of the engine oil 41 that flows to the outside of the oil clearance 60 via the second groove oil passage 67B is greater than the flow rate (second relief flow rate QC) of the engine oil 41 that flows to the outside of the oil clearance 60 via the second relief oil passage 65B. The relationship between the passage area SB and the passage area TD is determined by setting the relationship between the size of the trailing side crush relief 73R and the size of the trailing side oil groove 93R, and the relationship between the size of the leading side crush relief 83F and the size of the leading side oil groove 94F such that the second groove flow rate QF is greater than the second relief flow rate QC.

As described above, the advantages that are the same as the advantages (1) to (14) of the first embodiment are provided according to the crank bearing 6 of the tenth embodiment.

Next, an eleventh embodiment of the present invention will be described with reference to FIGS. 40 and 41.

The crank bearing 6 of the present embodiment is configured by modifying part of the crank bearing 6 of the first embodiment as follows. In FIGS. 40 and 41, the components that are the same as those of the first embodiment are given the same reference numerals as the first embodiment.

Figure 40:
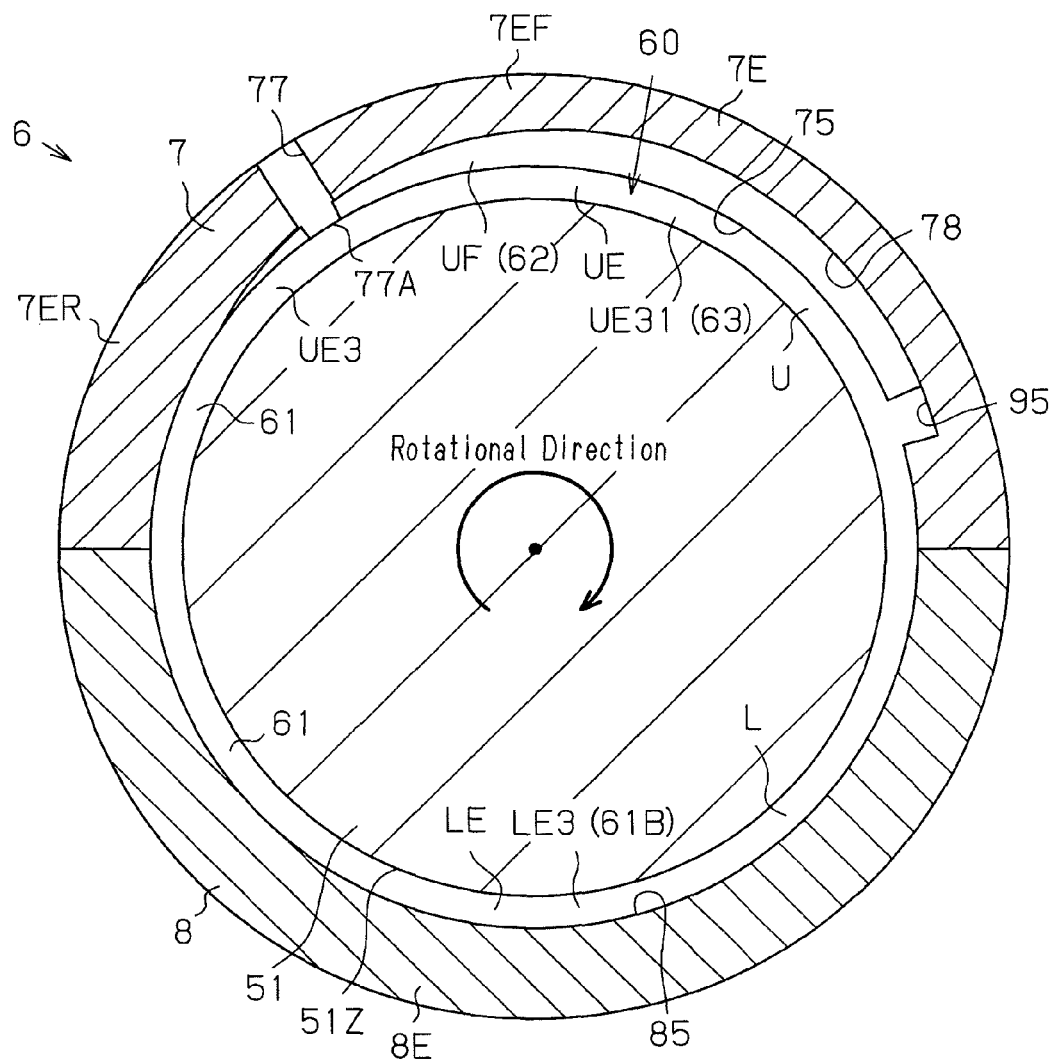
FIG. 40 is a cross-sectional view illustrating an upper bearing according to an eleventh embodiment of the present invention.
Figure 41:
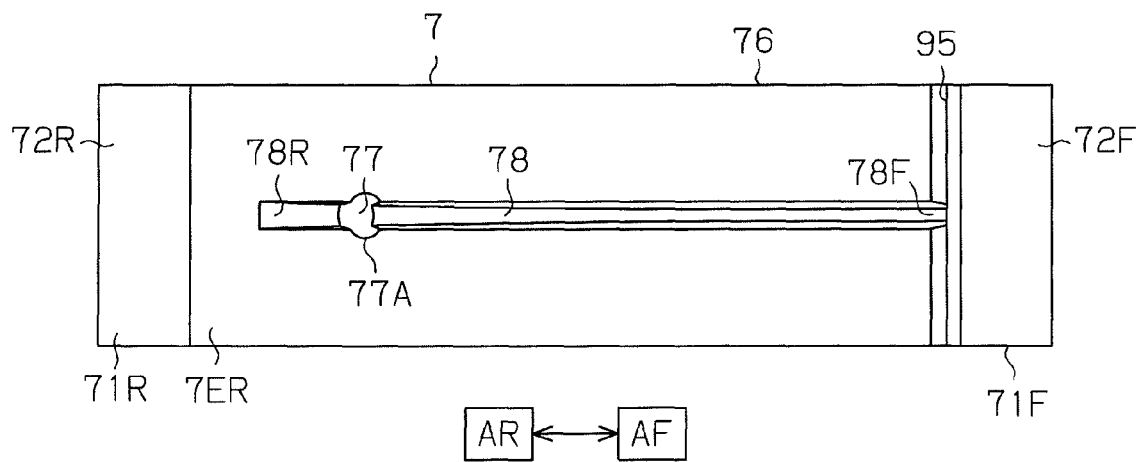
FIG. 41 is a bottom view illustrating the inner circumferential surface of the upper bearing of the crank bearing of FIG. 40.

In the crank bearing 6 of the eleventh embodiment, the crush reliefs 73 and the chamfers 74 of the upper bearing 7 are omitted as shown in FIGS. 40 and 41. Also, in the lower bearing 8 of the eleventh embodiment, the crush reliefs 83 and the chamfers 84 are omitted. The leading end portion 78F of the oil groove 78 is provided between the inner circumference opening 77A and the leading side matching surface 72F. The upper bearing 7 is provided with an oil groove 95, which connects the oil groove 78 to the side surfaces 76 of the upper bearing 7. The oil groove 95 is an oil passage for discharging the engine oil 41 in the oil groove 78 to the outside of the oil clearance 60 from the side surfaces 76. The depth of the oil groove 78 is set to be the greatest at the circumferential center CB. Also, the depth of the oil groove 78 is set to be gradually reduced from the circumferential center CB to the leading end portion 78F. The depth of the oil groove 78 is set to be gradually reduced from the circumferential center CB toward the trailing end portion 78R and become zero at the trailing end portion 78R. The oil groove 95 may be parallel to the axis of the crank bearing 6, or may be inclined with respect to the axis of the crank bearing 6. The width of the oil groove 95 may be changed between the oil groove 78 and the side surfaces 76.

As described above, according to the crank bearing 6 of the eleventh embodiment, the following advantage (21) is provided in addition to the advantages (2) to (4), (13), and (14) of the first embodiment.

(21) In the crank bearing 6 of the present embodiment, the non-undercut portion 7ER is provided on the side in the trailing direction AR of the inner circumference opening 77A of the oil hole 77. The crank bearing 6 of the present embodiment is also provided with the oil groove 95, which connects the oil groove 78 to the side surfaces 76. Thus, the amount of the engine oil 41 that is supplied to the region of the oil clearance 60 on the side in the trailing direction AR of the inner circumference opening 77A of the oil hole 77 via the oil groove 78 is reduced as compared to the case where the non-undercut portion 7ER is not provided. This reduces the amount of the engine oil 41 that flows to the outside of the oil clearance 60. Also, since the foreign matter that has flowed into the oil clearance 60 via the oil hole 77 flows to the outside of the oil clearance 60 along the axial direction of the crank bearing 6 by flowing through the oil groove 78 and the oil groove 95, damage caused by foreign matter is inhibited. Since the non-undercut portion 7ER is provided on the side in the trailing direction AR of the inner circumference opening 77A of the oil hole 77, foreign matter in the oil groove 78 is prevented from flowing into the oil clearance 60 corresponding to the non-undercut portion 7ER by rotation of the crankshaft 5. Thus, damage caused by foreign matter is inhibited in a suitable manner. As described above, according to the crank bearing 6 of the eleventh embodiment, the amount of the engine oil 41 that flows out of the oil clearance 60 is reduced while inhibiting damage caused by foreign matter.

Next, a twelfth embodiment of the present invention will be described with reference to FIGS. 42 and 43.

The crank bearing 6 of the present embodiment is configured by modifying part of the crank bearing 6 of the first embodiment as follows. In FIGS. 42 and 43, the components that are the same as those of the first embodiment are given the same reference numerals as the first embodiment.

Figure 42:
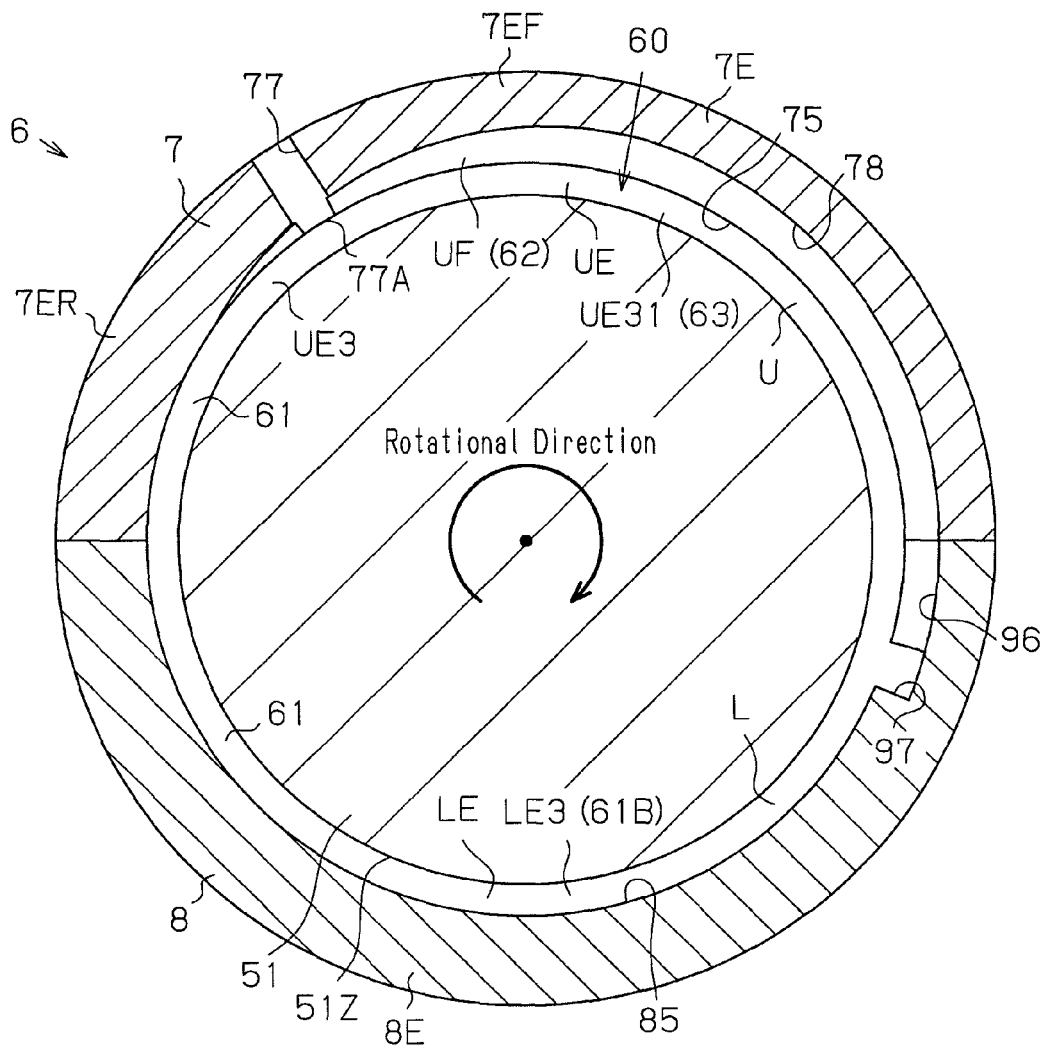
FIG. 42 is a cross-sectional view illustrating an upper bearing according to a twelfth embodiment of the present invention.
Figure 43:
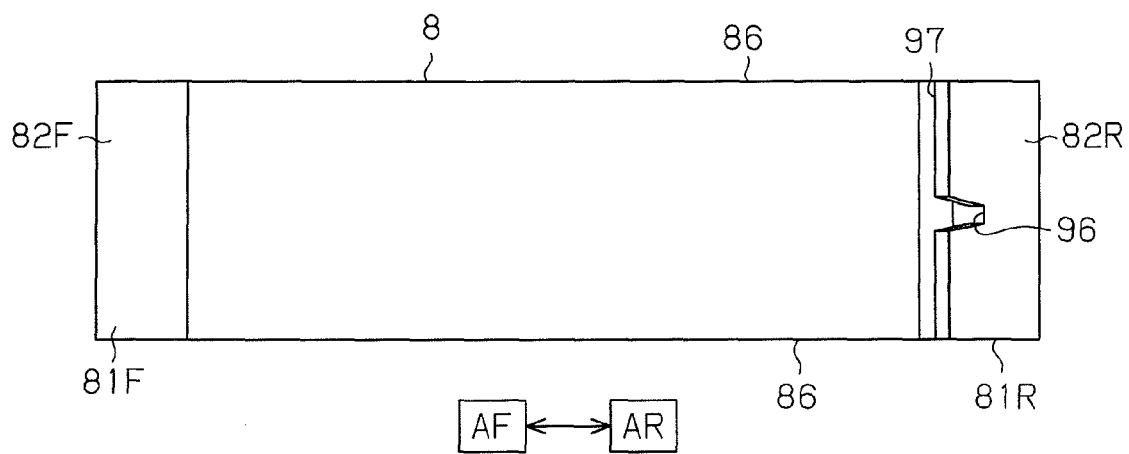
FIG. 43 is a plan view illustrating the inner circumferential surface of the lower bearing of the crank bearing of FIG. 42.

As shown in FIGS. 42 and 43, in the crank bearing 6 of the present embodiment, the crush reliefs 73 and the chamfers 74 of the upper bearing 7 are omitted. Also, the crush reliefs 83 and the chamfers 84 of the lower bearing 8 are omitted. The lower bearing 8 is provided with an oil groove 96, which communicates with the oil groove 78 of the upper bearing 7, and an oil groove 97, which connects the oil groove 96 to the side surfaces 86 of the lower bearing 8. The oil groove 96 is an oil passage for permitting the engine oil 41 supplied from the oil groove 78 to flow in the circumferential direction of the lower bearing 8. The oil groove 97 is an oil passage for discharging the engine oil 41 in the oil groove 96 to the outside of the oil clearance 60 from the side surfaces 86. The oil groove 97 may be parallel to the axis of the crank bearing 6, or may be inclined with respect to the axis of the crank bearing 6. The width of the oil groove 97 may be changed between the oil groove 96 and the side surfaces 86.

As described above, according to the crank bearing 6 of the twelfth embodiment, the following advantage (22) is provided in addition to the advantages (2) to (5), (13), and (14) of the first embodiment.

(22) In the crank bearing 6 of the present embodiment, the non-undercut portion 7ER is provided on the side in the trailing direction AR of the inner circumference opening 77A of the oil hole 77. The crank bearing 6 of the twelfth embodiment is provided with the oil groove 97, which connects the oil groove 96 of the lower bearing 8 to the side surfaces 86. Thus, as compared to the case where the non-undercut portion 7ER is not provided, the amount of the engine oil 41 that is supplied to the region of the oil clearance 60 on the side in the trailing direction AR of the inner circumference opening 77A of the oil hole 77 via the oil groove 78 is reduced. This reduces the amount of the engine oil 41 that flows to the outside of the oil clearance 60. Since foreign matter that has flowed into the oil clearance 60 via the oil hole 77 flows to the outside of the oil clearance 60 from the axial direction of the crank bearing 6 by flowing through the oil groove 78, the oil groove 96, and the oil groove 97, damage caused by foreign matter is inhibited. Since the non-undercut portion 7ER is provided on the side in the trailing direction AR of the inner circumference opening 77A of the oil hole 77, foreign matter in the oil groove 78 is prevented from flowing into the oil clearance 60 corresponding to the non-undercut portion 7ER by rotation of the crankshaft 5. Thus, damage caused by foreign matter is inhibited in a suitable manner. As described above, according to the crank bearing 6 of the twelfth embodiment, the amount of the engine oil 41 that flows out of the oil clearance 60 is reduced while inhibiting damage caused by foreign matter.

Next, a thirteenth embodiment of the present invention will be described with reference to FIG. 44.

The crank bearing 6 of the present embodiment is configured by modifying part of the crank bearing 6 of the first embodiment as follows. In FIG. 44, the components that are the same as those of the first embodiment are given the same reference numerals as the first embodiment.

Figure 44:
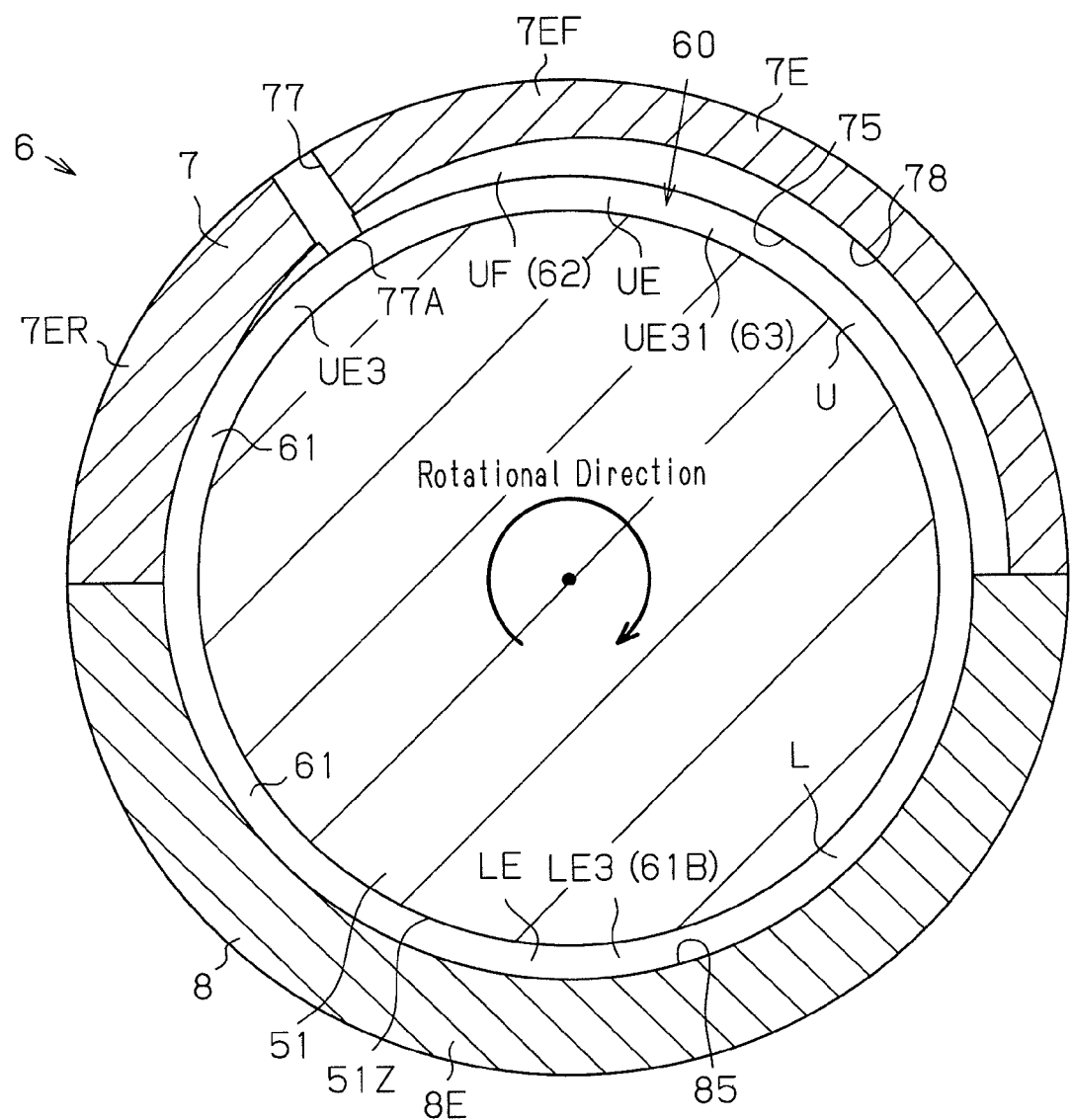
FIG. 44 is a cross-sectional view illustrating an upper bearing according to a thirteenth embodiment of the present invention.

As shown in FIG. 44, in the crank bearing 6 of the thirteenth embodiment, the crush reliefs 73 and the chamfers 74 of the upper bearing 7 are omitted. Also, the crush reliefs 83 and the chamfers 84 of the lower bearing 8 are omitted. The depth of the oil groove 78 is set such that the foreign matter at the leading end portion 78F of the oil groove 78 flow into the oil clearance 60 corresponding to the lower bearing 8.

As described above, according to the crank bearing 6 of the thirteenth embodiment, the following advantage (23) is provided in addition to the advantages (2) to (5), (13), and (14) of the first embodiment.

(23) In the crank bearing 6 of the thirteenth embodiment, the non-undercut portion 7ER is provided on the side in the trailing direction AR of the inner circumference opening 77A of the oil hole 77. The oil groove 78 is formed to connect the inner circumference opening 77A of the oil hole 77 to the leading side matching surface 72F. Thus, as compared to the case where the non-undercut portion 7ER is not provided, the amount of the engine oil 41 that is supplied to the oil clearance 60 on the side in the trailing direction AR of the inner circumference opening 77A of the oil hole 77 via the oil groove 78 is reduced. This reduces the amount of the engine oil 41 that flows out of the oil clearance 60. The foreign matter that has flowed into the oil clearance 60 via the oil hole 77 is guided through the oil groove 78 to the vicinity of the boundary between the oil clearance 60 corresponding to the upper bearing 7 and the oil clearance 60 corresponding to the lower bearing 8. Thus, since the foreign matter in the oil groove 78 flows from the oil clearance 60 corresponding to the upper bearing 7 to the oil clearance 60 corresponding to the lower bearing 8 via the boundary, the damage on the upper bearing 7 is inhibited. Also, since the non-undercut portion 7ER is provided on the side in the trailing direction AR of the inner circumference opening 77A of the oil hole 77, the foreign matter in the oil groove 78 is prevented from flowing into the oil clearance 60 corresponding to the non-undercut portion 7ER by rotation of the crankshaft 5. Thus, damage on the upper bearing 7 is inhibited in a suitable manner. As described above, according to the crank bearing 6 of the thirteenth embodiment, the amount of the engine oil 41 that flows out of the oil clearance 60 is reduced while inhibiting damage caused by foreign matter.

Each of the above embodiments may be modified as follows.

The above embodiments may be combined as required.

In each of the embodiments, the slide bearing according to the present invention is embodied in the crank bearing 6 of the engine 1. However, the present invention may be applied to slide bearings other than the crank bearing. That is, the present invention may be applied to any slide bearing in a manner according to each of the above embodiments as long as the slide bearing is divided into a pair of semicircular bearing bodies and supports a rotary shaft via lubricant.

In each of the above embodiments, the slide bearing of the present invention is applied to the inline four-cylinder engine 1, but the slide bearing of the present invention may be applied to engines employing other cylinder arrangement.

In each of the above embodiments, the engine 1 is assumed as the torque transmitting apparatus to which the slide bearing of the present invention is applied. However, the slide bearing of the present invention may be applied to any torque transmitting apparatus that includes a main shaft, which rotates in one direction, and a slide bearing for main shaft, which supports the main shaft.

The invention claimed is:

1. A slide bearing for supporting a rotary shaft, the slide bearing comprising a semicircular main bearing body and a semicircular sub-bearing body, which can be split from each other, the main bearing body including a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing, wherein the first oil passage includes an inner circumference opening, which is open to the inner circumference of the main bearing body, wherein a first auxiliary oil passage for discharging the lubricant in the second oil passage to the outside from the axial direction of the slide bearing is provided in at least one of the sub-bearing body and a region on a leading side of the inner circumference opening of the main bearing body in the rotational direction of the rotary shaft, and wherein the second oil passage continuously extends toward the leading side in the rotation direction of the rotary shaft from the inner circumference opening to the first auxiliary oil passage, wherein a second auxiliary oil passage for discharging the lubricant in between the rotary shaft and a region on a trailing side of the inner circumference opening in the rotational direction of the rotary shaft to the outside from the axial direction of the slide bearing is formed on an inner circumference surface of the main bearing body, and wherein the main body includes a non-undercut portion in which no oil passage is formed in between the inner circumference opening and the second auxiliary oil passage, wherein the non-undercut portion extends from a trailing end portion of the second oil passage or a trailing end portion of the inner circumference opening in the rotational direction of the rotary shaft to the second auxiliary oil passage.

2. The slide bearing according to claim 1, wherein each of the main bearing body and the sub-bearing body includes matching surfaces, which contact the other bearing body, on the circumferential ends, and the matching surface of the main bearing body located on the leading side of the inner circumference opening in the rotation direction of the rotary shaft is defined as a leading side matching surface, and wherein the first auxiliary oil passage is formed by a chamfer provided on one edge of the leading side matching surface.

3. The slide bearing according to claim 1, wherein each of the main bearing body and the sub-bearing body includes matching surfaces, which contact the other bearing body, on the circumferential ends, and the matching surface of the main bearing body located on the leading side of the inner circumference opening in the rotation direction of the rotary shaft is defined as a leading side matching surface, and the end portion of the main bearing body including the leading side matching surface is defined as a leading end portion, and wherein the first auxiliary oil passage is formed by a crush relief provided on the leading end portion.

4. The slide bearing according to claim 1, wherein the main bearing body includes a leading end portion located on the leading side of the inner circumference opening in the rotational direction of the rotary shaft and, a trailing end portion located on the trailing side of the inner circumference opening in the rotational direction of the rotary shaft, and wherein the sub-bearing body has a trailing end portion, which corresponds to the leading end portion of the main bearing body, and a leading end portion, which corresponds to the trailing end portion of the main bearing body, and wherein the first auxiliary oil passage is a provided at a matching portion between the leading end portion of the main bearing body and the trailing end portion of the sub-bearing portion, and the second auxiliary oil passage is provided at a matching portion between the trailing end portion of the main bearing body and the leading end portion of the sub-bearing body.

5. A torque transmitting apparatus comprising the slide bearing according to claim 1, and a main shaft, which rotates in one direction, wherein the main shaft serves as a rotary shaft supported by the slide bearing.

6. An engine comprising the slide bearing according to claim 1, and a crank shaft, which serves as a rotary shaft supported by the slide bearing.

7. A slide bearing, for supporting a rotary shaft, the slide bearing comprising a semicircular main bearing body and a semicircular sub-bearing body, which can be split from each other, the main bearing body including a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing,
  wherein the first oil passage includes an inner circumference opening, which is open to the inner circumference of the main bearing body,
  wherein the main bearing body includes a non-undercut portion in which no oil passage is formed on a trailing side of the inner circumference opening in the rotational direction of the rotary shaft,
  wherein an auxiliary oil passage for discharging the lubricant in the second oil passage to the outside from the axial direction of the slide bearing is provided in at least one of the sub-bearing body and a region on a leading side of the inner circumference opening of the main bearing body in the rotational direction of the rotary shaft,
  wherein the second oil passage continuously extends toward the leading side in the rotation direction of the rotary shaft from the inner circumference opening to the auxiliary oil passage,
  wherein each of the main bearing body and the sub-bearing body includes matching surfaces, which contact the other bearing body, on the circumferential ends, and the matching surface of the main bearing assembly located on the leading side of the inner circumference opening in the rotation direction of the rotary shaft is defined as a leading side matching surface, and
  wherein the depth of the second oil passage is set to be reduced toward the leading side matching surface from a longitudinally middle portion of the second oil passage.

8. A slide bearing, for supporting a rotary shaft, the slide bearing comprising a semicircular main bearing body and a semicircular sub-bearing body, which can be split from each other, the main bearing body including a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing,
  wherein the first oil passage includes an inner circumference opening, which is open to the inner circumference of the main bearing body,
  wherein the main bearing body includes a non-undercut portion in which no oil passage is formed on a trailing side of the inner circumference opening in the rotational direction of the rotary shaft,
  wherein an auxiliary oil passage for discharging the lubricant in the second oil passage to the outside from the axial direction of the slide bearing is provided in at least one of the sub-bearing body and a region on a leading side of the inner circumference opening of the main bearing body in the rotational direction of the rotary shaft,
  wherein the second oil passage continuously extends toward the leading side in the rotation direction of the rotary shaft from the inner circumference opening to the auxiliary oil passage,
  wherein the number of the inner circumference opening is one, and the inner circumference opening is located on the trailing side of the circumferential center of the main bearing body in the rotational direction of the rotary shaft.

9. A slide bearing, for supporting a rotary shaft, the slide bearing comprising a semicircular main bearing body and a semicircular sub-bearing body, which can be split from each other, the main bearing body including a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing,
  wherein the first oil passage includes an inner circumference opening, which is open to the inner circumference of the main bearing body,
  wherein the main bearing body includes a non-undercut portion in which no oil passage is formed on a trailing side of the inner circumference opening in the rotational direction of the rotary shaft,
  wherein an auxiliary oil passage for discharging the lubricant in the second oil passage to the outside from the axial direction of the slide bearing is provided in at least one of the sub-bearing body and a region on a leading side of the inner circumference opening of the main bearing body in the rotational direction of the rotary shaft,
  wherein the second oil passage continuously extends toward the leading side in the rotation direction of the rotary shaft from the inner circumference opening to the auxiliary oil passage,
  wherein the number of the inner circumference opening is one, and the inner circumference opening is located on the leading side of the circumferential center of the main bearing body in the rotational direction of the rotary shaft.

10. A slide bearing for supporting a rotary shaft, the slide bearing comprising a semicircular main bearing body and a semicircular sub-bearing body, which can be split from each other, the main bearing body including a first oil passage for introducing lubricant from the outside to a gap between the slide bearing and the rotary shaft, and a second oil passage for permitting the lubricant introduced between the slide bearing and the rotary shaft to flow in the circumferential direction of the slide bearing,
  wherein the first oil passage includes an inner circumference opening, which is open to the inner circumference of the main bearing body,
  wherein the main bearing body includes a leading end portion located on a leading side of the inner circumference opening in the rotational direction of the rotary shaft, and the sub-bearing portion includes a trailing end portion corresponding to the leading end portion, and a first auxiliary oil passage, which connects the second oil passage to a side surface of the slide bearing, is provided at a matching portion between the leading end portion of the main bearing body and the trailing end portion of the sub-bearing body, wherein the second oil passage continuously extends toward the leading side in the rotation direction of the rotary shaft from the inner circumference opening to the first auxiliary oil passage, wherein a second auxiliary oil passage for discharging the lubricant in between the rotary shaft and a region on a trailing side of the inner circumference opening in the rotational direction of the rotary shaft to the outside from the axial direction of the slide bearing is formed on an inner circumference surface of the main bearing body, wherein the main body includes a non-undercut portion in which no oil passage is formed in between the inner circumference opening and the second auxiliary oil passage, wherein a crush relief, which forms a relief oil passage, and a chamfer, which forms a chamfer oil passage, are provided on the inner circumferential side of at least one of the leading end portion of the main bearing body and the trailing end portion of the sub-bearing body, and the first auxiliary oil passage is formed by the relief oil passage and the chamfer oil passage, and wherein the relationship between the passage area of the chamfer oil passage and the passage area of the relief oil passage is set such that the flow rate of the lubricant in the chamfer oil passage is greater than the flow rate of the lubricant in the relief oil passage, wherein the non-undercut portion extends from a trailing end portion of the second oil passage or a trailing end portion of the inner circumference opening in the rotational direction of the rotary shaft to the second auxiliary oil passage.

11. The slide bearing according to claim 10, wherein each of the main bearing body and the sub-bearing body includes matching surfaces, which contact the other bearing body, on the circumferential ends, and the matching surface provided on the leading end portion of the main bearing body is defined as a leading side matching surface, and wherein the crush relief is provided on the leading end portion of the main bearing body, and the chamfer is provided on one edge of the leading side matching surface.

12. The slide bearing according to claim 10, wherein each of the main bearing body and the sub-bearing body includes matching surfaces, which contact the other bearing body, on the circumferential ends, and the matching surface provided on the leading end portion of the main bearing body is defined as a leading side matching surface, and the matching surface of the sub-bearing body, which contacts the leading side matching surface, is defined as a trailing side matching surface, and wherein the crush relief is provided on the trailing end portion of the sub-bearing body, and the chamfer is provided on one edge of the trailing side matching surface.

13. The slide bearing according to claim 10, wherein each of the main bearing body and the sub-bearing body includes matching surfaces, which contact the other bearing body, on the circumferential ends, and the matching surface provided on the leading end portion of the main bearing body is defined as a leading side matching surface, and the matching surface of the sub-bearing body, which contacts the leading side matching surface, is defined as a trailing side matching surface, and wherein the crush relief is provided on the leading end portion of the main bearing and on the trailing end portion of the sub-bearing body, and the chamfer is provided on one edge of the leading side matching surface and on one edge of the trailing side matching surface.

14. The slide bearing according to claim 10, wherein the main bearing body includes a trailing end portion located on the trailing side of the inner circumference opening in the rotational direction of the rotary shaft, the sub-bearing portion includes a leading end portion corresponding to the trailing end portion of the main bearing body, and the second auxiliary oil passage is provided at a matching portion between the trailing end portion of the main bearing body and the leading end portion of the sub-bearing body.

* * * * *